(12) United States Patent
Saito

(10) Patent No.: US 7,138,175 B2
(45) Date of Patent: Nov. 21, 2006

(54) THERMOPLASTIC POLYMER COMPOSITION

(75) Inventor: Hidekazu Saito, Okayama (JP)

(73) Assignee: Kuraray Co., Ltd., Okayama (JP)

( * ) Notice: Subject to any disclaimer, the term of this patent is extended or adjusted under 35 U.S.C. 154(b) by 0 days.

(21) Appl. No.: 10/519,099

(22) PCT Filed: Jul. 4, 2003

(86) PCT No.: PCT/JP03/08505

§ 371 (c)(1),
(2), (4) Date: Dec. 27, 2004

(87) PCT Pub. No.: WO2004/005403

PCT Pub. Date: Jan. 15, 2004

(65) Prior Publication Data

US 2005/0261427 A1   Nov. 24, 2005

(30) Foreign Application Priority Data

Jul. 9, 2002  (JP)  ............................. 2002-199846

(51) Int. Cl.
C08L 53/02 (2006.01)
C08L 75/04 (2006.01)
C08J 9/06 (2006.01)

(52) U.S. Cl. .................... 428/304.4; 521/155; 525/89; 525/92 C

(58) Field of Classification Search ............. 525/92 C, 525/89; 521/155; 428/304.4
See application file for complete search history.

(56) References Cited

U.S. PATENT DOCUMENTS

| | | | |
|---|---|---|---|
| 5,420,170 A * | 5/1995 | Lutter et al. ................ | 521/159 |
| 5,436,295 A | 7/1995 | Nishikawa et al. | |
| 5,859,131 A | 1/1999 | Ishiura et al. | |
| 6,106,952 A | 8/2000 | Yamashita et al. | |
| 2004/0132907 A1 * | 7/2004 | Nakamura et al. ............ | 525/88 |
| 2004/0171751 A1 | 9/2004 | Saito | |
| 2004/0176525 A1 | 9/2004 | Saito | |

FOREIGN PATENT DOCUMENTS

| | | |
|---|---|---|
| JP | 10-292103 | 11/1998 |
| JP | 11-323073 | 11/1999 |
| WO | WO 02/090433 A1 * | 11/2002 |

* cited by examiner

Primary Examiner—Jeffrey Mullis
(74) Attorney, Agent, or Firm—Oblon, Spivak, McClelland, Maier & Neustadt, P.C.

(57) ABSTRACT

According to the present invention, it is provided a thermoplastic polymer composition comprising an alkyl ester of (meth)acrylic acid copolymer and a block copolymer prepared by extending, with a specific polyurethane component, the polymer chain of a block copolymer, which may be hydrogenated, having a polymer block of an aromatic vinyl compound and a polymer block of a conjugated diene.

The thermoplastic polymer composition of the present invention has excellent properties such as non-tackiness, melt-moldability and melt-adhesiveness to other resins upon the lamination therewith. Also, the thermoplastic polymer composition of the present invention has melt characteristics suitable for the production of a foam. Therefore, the thermoplastic polymer composition of the present invention can be applied favorably for the production of various molded articles including a foam.

20 Claims, No Drawings

THERMOPLASTIC POLYMER COMPOSITION

TECHNICAL FIELD

The present invention relates to a thermoplastic polymer composition comprising an alkyl ester of (meth)acrylic acid copolymer and a block copolymer prepared by extending, with a specific polyurethane component, the polymer chain of a block copolymer, which may be hydrogenated, having a polymer block of an aromatic vinyl compound and a polymer block of a conjugated diene.

BACKGROUND ART

Block copolymers having a styrene polymer block and a conjugated diene polymer block [hereinafter referred to as "styrene-conjugated diene block copolymer"] and the hydrogenated products thereof can be readily formulated into a molded article, because they can be plasticized and molten by heating. They have rubber elasticity at an ordinary temperature and show excellent balance between flexibility and mechanical characteristics. Therefore, in recent years, they have been widely used in various fields as one of the thermoplastic elastomers.

The Japanese Patent Application Laid-open No. Sho 52-150464 describes a composition in which a thermoplastic resin having specific properties is blended with a styrene-conjugated diene block copolymer and/or a hydrogenated product thereof. The publication discloses that the composition is suitable to insulators for conductors and soldering wires, and that a thermoplastic polyurethane is used as one of the thermoplastic resins described above. However, since the styrene-conjugated diene block copolymer, which may be hydrogenated, and the thermoplastic polyurethane is poor in compatibility, the properties of each polymer fail to be provided sufficiently, and a useful polymer composition cannot be obtained.

Further, various proposals have been made so far for the techniques with an aim of improving the melt-adhesiveness of the styrene-conjugated diene block copolymer or the hydrogenated product thereof. For example, a melt-adhesive composition comprising a styrene-conjugated diene block copolymer, which may be hydrogenated, and a thermoplastic polyurethane has been known [see the Japanese Patent Application Laid-open Nos. Hei 6-65467, Hei 6-107898 and Hei 8-72204]. However, this melt-adhesive composition sometimes results in a problem of failing to give a sufficient bonding strength or the lack of the durability of a bonding strength depending on the kind of the material laminated therewith. Moreover, the compatibility between the styrene-conjugated diene block copolymer, which may be hydrogenated, and the thermoplastic polyurethane in this melt-adhesive composition is not quite satisfactory, so that the composition has a problem such as delamination or instability of the bonding strength in the laminate structure obtained, for example, by composite injection molding.

Also, a polymer composition comprising a thermoplastic polyurethane and a styrene-conjugated diene block copolymer, which may be hydrogenated, modified with hydroxyl group, carboxyl group or a derivative thereof has been proposed with an aim of improving the compatibility between the styrene-conjugated diene block copolymer, which may be hydrogenated, and the thermoplastic polyurethane and improving the melt-adhesiveness of the polymer composition comprising the styrene-conjugated diene block copolymer, which may be hydrogenated, and the thermoplastic polyurethane [see the Japanese Patent Application Laid-open Nos. Sho 63-99257 and Hei 3-234755]. Further, there has been proposed addition of a phosphorus compound or a phenolic compound to the above-described composition to improve the thermal stability during processing [see the Japanese Patent Application Laid-open No. Hei 7-126474]. However, a satisfactory result has not yet been obtained, because these compositions are still poor in non-tackiness, melt-moldability such as melt-discharge stability, and melt-adhesiveness to other resins upon lamination.

As a polymer composition which can solve the above-described problems, the U.S. Pat. No. 6,106,952 discloses the polymer composition comprising (1) a block copolymer, which may be hydrogenated, of an aromatic vinyl compound and a conjugated diene, (2) a block copolymer having a polymer block (I) of a block copolymer, which may be hydrogenated, of an aromatic vinyl compound and a conjugated diene, and a polymer block (II) of a polyurethane, (3) a thermoplastic polyurethane and (4) a paraffin oil.

In addition, the polymer composition of a thermoplastic polyurethane and a block copolymer, which may be hydrogenated, of an aromatic vinyl compound and a conjugated diene can be blended with an alkyl ester of (meth)acrylic acid copolymer having a number average molecular weight of 200,000 or more and a thermal decomposition type foaming agent. And the resulting composition can be formulated into a foam by an extrusion foam molding and the like [see the Japanese Patent Application Laid-open No. Hei 10-292103]. A laminate structure having a layer of a foam obtained by the above-described method is described to be useful for man-made leather and the like.

DISCLOSURE OF THE INVENTION

In recent years, the field in which various elastomers such as a styrene-conjugated diene block copolymer are applied has been extended. Therefore, elastomers having improved properties have been required.

The present invention is made to meet such a requirement. Namely, the object of the present invention is to provide a novel thermoplastic polymer composition having excellent properties such as non-tackiness, melt-moldability and melt-adhesiveness to other resins upon lamination.

The present inventor has studied on the polymer composition described in the U.S. Pat. No. 6,106,952 and found that the block copolymer ["a block copolymer (2)"], which is known as a component of the polymer composition of the U.S. Pat. No. 6,106,952, may have excellent properties such as non-tackiness, melt-moldability and melt-adhesiveness to other resins upon lamination, even if it could be used alone. In addition, the present inventor has found that a thermoplastic polymer composition having excellent properties can be obtained by blending such a block copolymer with an acrylic polymer. The present invention was completed based on such findings and additional further studies.

Thus, the present invention provides a thermoplastic polymer composition, which comprises: (i) an alkylester of (meth)acrylic acid copolymer (I) having a number average molecular weight of not less than 100,000; and (ii) a block copolymer (II) having a polymer block (1) of a block copolymer, which may be hydrogenated, of an aromatic vinyl compound polymer block and a conjugated diene polymer block (b-1), and a polymer block (2) of a polyurethane in an amount such that the weight ratio of the alkyl ester of (meth)acrylic acid copolymer (I) based on the block copolymer (II) falls between 60/40 and 0.1/99.9.

BEST MODE FOR CARRYING OUT THE INVENTION

The alkyl ester of (meth)acrylic acid copolymer (I) should have a number average molecular weight of not less than 100,000. By using an alkyl ester of (meth)acrylic acid copolymer (I) having such a number average molecular weight, a thermoplastic polymer composition having excellent properties such as non-tackiness and melt-moldability can be obtained. The number average molecular weight of the alkyl ester of (meth)acrylic acid copolymer (I) is preferably not more than 5,000,000 because the thermoplastic polymer composition which gives a molded article having good appearance can be obtained.

The alkyl ester of (meth)acrylic acid copolymer (I) is the one having a number average molecular weight of 100,000 or more, preferably 150,000 or more, still more preferably 200,000 or more, and the most preferably 300,000 or more, which is mainly constituted from alkyl esters of acrylic acid and/or alkyl esters of methacrylic acid having 1 to 10 carbon atoms of the alkyl groups.

Preferred examples of the alkyl ester of (meth)acrylic acid which constitute the alkylester of (meth)acrylic acid copolymer (I) include alkyl esters of acrylic acid such as methyl acrylate, ethyl acrylate, n-propyl acrylate, isopropyl acrylate, butyl acrylate, hexyl acrylate and 2-ethylhexyl acrylate; alkyl esters of methacrylic acid such as methyl methacrylate, ethyl methacrylate, n-propyl methacrylate, isopropyl methacrylate, butyl methacrylate, hexyl methacrylate and 2-ethylhexyl methacrylate; and so on.

The alkyl ester of (meth)acrylic acid copolymer (I) can be constituted from one or more of the above-described alkyl esters of (meth)acrylic acid. Among them, the preferred alkyl ester of (meth)acrylic acid copolymer (I) is the one mainly made of methyl methacrylate and butyl acrylate.

The alkyl ester of (meth)acrylic acid copolymer (I) can optionally contain, in addition to the structural unit derived from the above-described alkyl ester of (meth)acrylic acid, a structural unit derived from another copolymerizable unsaturated monomer in small amount, generally not more than 25 mol %. The copolymerizable unsaturated monomer includes, for example, ethylene, butadiene, isoprene, styrene, $\alpha$-methylstyrene, acrylonitrile and so on.

The block copolymer (II) is a block copolymer having a polymer block (1) of a block copolymer, which may be hydrogenated, of an aromatic vinyl compound polymer block (a-1) and a conjugated diene polymer block (b-1), and a polymer block (2) of a polyurethane.

In the block copolymer (II), the bonding form of the polymer block (1) and the polymer block (2) may be linear, branched, radial or mixed type thereof. Preferably, the polymer block (1) and the polymer block (2) are bonded in linear form.

The block copolymer (II) may have various structures such as $\alpha$-$\beta$, $\alpha$-$\beta$-$\alpha$ and $\beta$-$\alpha$-$\beta$, wherein $\alpha$ means the polymer block (1) and $\beta$ means the polymer block (2). The di-block structure of $\alpha$-$\beta$ is preferred. By using the block copolymer (II) having a di-block structure, a thermoplastic polymer composition having more excellent properties such as non-tackiness, flexibility and melt-moldability can be obtained.

When the block copolymer (II) has two or more of the polymer blocks (1), each polymer block (1) may be the same or different. On the other hand, when the block copolymer (II) has two or more of the polymer blocks (2), each polymer block (2) may be the same or different. For example, the two polymer blocks (1) in the tri-block copolymer having the structure of $\alpha$-$\beta$-$\alpha$, or the two polymer blocks (2) in the tri-block copolymer having the structure of $\beta$-$\alpha$-$\beta$ may be the same or different in the species or the bonding forms of the structural unit, their number average molecular weight, and so on.

In the block copolymer (II), the weight ratio of the polymer block (1) based on the polymer block (2) falls between preferably 5/95 and 95/5, more preferably 10/90 and 90/10, still more preferably 20/80 and 80/20, and the most preferably 30/70 and 70/30.

The aromatic vinyl compound which constitutes the aromatic vinyl compound polymer block (a-1) in the polymer block (1) can include, for example, styrene, $\alpha$-methylstyrene, $\beta$-methylstyrene, o-methylstyrene, m-methylstyrene, p-methylstyrene, 2,4-dimethylstyrene, 2,4,6-trimethylstyrene, 4-propylstyrene, t-butylstyrene, 4-cyclohexylstyrene, 4-dodecylstyrene, 2-ethyl-4-benzylstyrene, 4-(phenylbutyl) styrene, 1-vinylnaphthalene, vinylanthracene, indene, acetonaphthylene, monofluorostyrene, difluorostyrene, monochlorostyrene and methoxystyrene. The aromatic vinyl compound polymer block (a-1) may have a structural unit comprising only one aromatic vinyl compound, or may have a structural unit comprising two or more of the aromatic vinyl compounds. Among them, it is preferred that the aromatic vinyl compound polymer block (a-1) mainly comprises structural units derived from styrene and/or $\alpha$-methylstyrene.

The aromatic vinyl compound polymer block (a-1) can optionally have a small amount of structural units comprising other copolymerizable monomers in addition to the structural units comprising the aromatic vinyl compounds. The ratio of the structural units comprising other copolymerizable monomers in this case is preferably 30% by weight or less, and more preferably 10% by weight or less, based on the weight of the aromatic vinyl compound polymer block. The other copolymerizable monomers in this case can include, for example, 1-butene, pentene, hexene, butadiene, 2-methyl-1,3-butadiene [namely, isoprene] and methyl vinyl ether.

The conjugated diene which constitutes the conjugated diene polymer block (b-1) in the polymer block (1) can include, for example, 1,3-butadiene, 2-methyl-1,3-butadiene [namely, isoprene], 2,3-dimethyl-1,3-butadiene, 1,3-pentadiene and 1,3-hexadiene. The conjugated diene polymer block (b-1) may have a structural unit comprising only one conjugated diene, or may have a structural unit comprising two or more of the conjugated dienes. When the conjugated diene polymer block (b-1) has a structural unit derived from two or more of the conjugated dienes, their bonding forms may be a random, tapered, partially block form, or combination of two or more of the forms.

In the polymer block (1), the conjugated diene polymer block (b-1) may be hydrogenated partially or entirely. In this case, the hydrogenation ratio of the conjugated diene polymer block (b-1) is in the range of preferably 50 mol % or more, more preferably 60 mol % or more, and still more preferably 80 mol % or more, from the viewpoint of the heat resistance, the weatherability and the light-resistance.

From the viewpoint of the flexibility, mechanical properties and melt-moldability of the resulting thermoplastic polymer composition, the conjugated diene polymer block (b-1) in the polymer block (1) is preferably at least one of the polymer block selected from the group consisting of a polyisoprene which may be hydrogenated, a polybutadiene which may be hydrogenated and a copolymer of isoprene and butadiene which may be hydrogenated.

The preferred conjugated diene polymer block (b-1) in the block copolymer (II) is a polyisoprene which may be hydrogenated, or a copolymer of isoprene and butadiene which may be hydrogenated and contains 1,2-bond and 3,4-bond in the range of 30 mol % or more, preferably 40 mol % or more, because it is possible to obtain an excellent thermoplastic polymer composition in melt-moldability [melt-discharge stability]. In addition, when the conjugated diene polymer block (b-1) in the block copolymer (II) is a polybutadiene which may be hydrogenated and contains 1,2-bond in the range of 60 mol % or more, preferably 80 mol % or more, it is possible to obtain an excellent thermoplastic polymer composition in melt-moldability [melt-discharge stability].

In the polymer block (1), the bonding form of the aromatic vinyl compound polymer block (a-1) and the conjugated diene polymer block (b-1) may be linear, branched, radial or mixed type thereof. Preferably, they are bonded in linear form.

The polymer block (1) may have various structures such as $(X-Y)_m-X$, $(X-Y)_n$ and $Y-(X-Y)_p$, wherein X means the aromatic vinyl compound polymer block; Y means the conjugated diene polymer block; and "m", "n" and "p" mean an integer of one or more, respectively. Among them, the polymer block (1) has preferably a structure in which two or more of the aromatic vinyl compound polymer blocks [X] and one or more of the conjugated diene polymer blocks [Y] are bonded in linear form, and has more preferably the tri-block structure of X-Y-X, because a thermoplastic polymer composition having excellent properties such as non-tackiness, flexibility, mechanical properties and melt-moldability can be obtained.

When the polymer block (1) has two or more of the aromatic vinyl compound polymer blocks [X], each polymer block [X] may be the same or different. On the other hand, when the polymer block (1) has two or more of the conjugated diene polymer blocks [Y], each polymer block [Y] may be the same or different. For example, the two polymer blocks [X] in the tri-block structure of X-Y-X, or the two polymer blocks [Y] in the tri-block structure of Y-X-Y may be the same or different in the species or the bonding forms of the aromatic vinyl compound or the conjugated diene, their number average molecular weights, and so on.

In the polymer block (1), the content of the structural unit derived from the aromatic vinyl compound is preferably from 5 to 90% by weight based on the total structural unit of the polymer block (1). By using the block copolymer (II) having a polymer block (1) in which the content of the structural unit derived from the aromatic vinyl compound falls within the above-described range, a thermoplastic polymer composition having excellent properties such as non-tackiness, flexibility, mechanical properties and melt-moldability can be obtained. The polymer block (1) contains the structural unit derived from the aromatic vinyl compound in the range of more preferably 10 to 90% by weight, and still more preferably 20 to 80% by weight, based on the total structural unit thereof.

In addition, in the polymer block (1), the number average molecular weight of the aromatic vinyl compound polymer block (a-1) and that of the conjugated diene polymer block (b-1) are not particularly limited, but the number average molecular weight of the aromatic vinyl compound polymer block (a-1) preferably ranges from 2,500 to 75,000, and the number average molecular weight of the conjugated diene polymer block (b-1) preferably ranges from 10,000 to 150,000, before hydrogenation. By using the block copolymer (II) having a polymer block (1) in which the number average molecular weight of the aromatic vinyl compound polymer block (a-1) or that of the conjugated diene polymer block (b-1) falls within the above-described range, a thermoplastic polymer composition having more improved properties such as non-tackiness, flexibility, mechanical properties and melt-moldability can be obtained.

The number average molecular weight of the polymer block (1) is preferably in the range of 15,000 to 300,000 before hydrogenation. By using the block copolymer (II) having a polymer block (1) in which the number average molecular weight falls within the above-described range, a thermoplastic polymer composition having excellent properties such as non-tackiness, flexibility, mechanical properties and melt-moldability can be obtained. The polymer block (1) has, more preferably, the number average molecular weight of 20,000 to 100,000.

The polymer block (2) of the block copolymer (II) is a polymer block of a polyurethane which is made of a high polymer polyol, a chain extender and an organic diisocyanate.

The high polymer polyol which constitutes the polymer block (2) can include, for example, polyester polyols, polyether polyols, polycarbonate polyols, polyester-polycarbonate polyols, polyolefin polyols, conjugated diene polymer based polyols, castor oil based polyols, silicone based polyols and vinyl polymer based polyols. One or more of these high polymer polyols can be used. Among them, the preferred high polymer polyol is at least one of the high polymer polyols selected from the group consisting of polyester polyols, polyether polyols and polyolefin polyols. The more preferred high polymer polyol is polyester polyols and/or polyether polyols.

The polyester polyols can be prepared, for example, by subjecting a polyol component and a poly carboxylic acid component to the esterification reaction or the ester exchange reaction, or by subjecting a lactone to a ring-opening polymerization under the presence of a polyol component as an initiator.

The polyol components used for the preparation of the polyester polyols can include ones conventionally used for the preparation of a polyester, for example, aliphatic diols having 2 to 15 carbon atoms such as ethylene glycol, diethylene glycol, triethylene glycol, propylene glycol, 1,3-propanediol, 2-methyl-1,3-propanediol, 2,2-diethyl-1,3-propanediol, 1,3-butanediol, 1,4-butanediol, 2-methyl-1,4-butanediol, neopentyl glycol, 1,5-pentanediol, 3-methyl-1,5-pentanediol, 1,6-hexanediol, 1,7-heptanediol, 1,8-octanediol, 2-methyl-1,8-octanediol, 2,7-dimethyl-1,8-octanediol, 1,9-nonanediol, 2-methyl-1,9-nonanediol, 2,8-dimethyl-1,9-nonanediol and 1,10-decanediol; alicyclic diols such as 1,4-cyclohexanediol, cyclohexanedimethanol and cyclooctanedimethanol; aromatic diols such as 1,4-bis(β-hydroxyethoxy)benzene; and polyhydric alcohols having not less than three hydroxyl groups such as trimethylolpropane, trimethylolethane, glycerin, 1,2,6-hexanetriol, pentaerythritol and diglycerol. One or more of these compounds can be used as a polyol component for the preparation of the polyester polyol.

Among them, for the preparation of the polyester polyol, the preferred polyol component is an aliphatic diol having 5 to 12 carbon atoms and a methyl group as a side chain such as 2-methyl-1,4-butanediol, 3-methyl-1,5-pentanediol, 2-methyl-1,8-octanediol, 2,7-dimethyl-1,8-octanediol, 2-methyl-1,9-nonanediol or 2,8-dimethyl-1,9-nonanediol. Especially, such an aliphatic diol having 5 to 12 carbon atoms and a methyl group as a side chain is used in the range of preferably 30 mol % or more, more preferably 50 mol % or more, based on the total polyol component used for the preparation of the polyester polyol.

The polycarboxylic acid components used for the preparation of the polyester polyols can include ones conventionally used for the preparation of a polyester, for example, aliphatic dicarboxylic acids having 4 to 12 carbon atoms such as succinic acid, glutaric acid, adipic acid, pimelic acid, suberic acid, azelaic acid, sebacic acid, dodecanedioic acid, methylsuccinic acid, 2-methylglutaric acid, 3-methylglutaric acid, trimethyladipic acid, 2-methyloctanedicarboxylic acid, 3,8-dimethyldecanedicarboxylic acid and 3,7-dimethyldecanedicarboxylic acid; alicyclid dicarboxylic acids such as cyclohexanedicarboxylic acid, dimer acid and hydrogenated product of dimer acid; aromatic dicarboxylic acids such as terephthalic acid, isophthalic acid, orthophthalic acid and naphthalenedicarboxylic acid; polycarboxylic acids such as trimellitic acid and pyromellitic acid; and derivatives thereof which can form esters, such as carboxylic acid esters and acid anhydrides. One or more of these compounds can be used as the polycarboxylic acid component. Among them, the preferred polycarboxylic acid component is an aliphatic dicarboxylic acid having 6 to 12 carbon atoms, and the more preferred polycarboxylic acid component is at least one compound selected from the group consisting of adipic acid, azelaic acid and sebacic acid.

The lactones used for the preparation of the polyester polyols can include, for example, ε-caprolactone and β-methyl-δ-valerolactone.

The polyether polyols can include, for example, ones prepared by the ring-opening polymerization of a cyclic ether such as a polyethylene glycol, a polypropylene glycol, a polytetramethylene ether glycol and a poly(methyltetramethylene ether) glycol. One or more of these polyether polyols can be used. Among them, the preferred polyether polyol is a polytetramethylene ether glycol and/or a poly(methyltetramethylene ether) glycol.

The polycarbonate polyols can include, for example, those obtained by the reaction of a polyol component and a carbonate compound such as a dialkyl carbonate, an alkylene carbonate and a diaryl carbonate.

The polyol component, which constitutes the polycarbonate polyols, can include ones exemplified above as a polyol component constituting the polyester polyols. The dialkyl carbonate can include, for example, dimethyl carbonate and diethyl carbonate. Examples of the alkylene carbonate can include ethylene carbonate; and examples of the diaryl carbonates can include diphenyl carbonate.

The polyester polycarbonate polyols can include, for example, those obtained by the reaction of a polyol component, a polycarboxylic acid component and a carbonate compound; those obtained by the reaction of a carbonate compound and a previously prepared polyester polyol and polycarbonate polyol; and those obtained by the reaction of a previously prepared polyester polyol and polycarbonate polyol, a polyol component and a polycarboxylic acid component.

The conjugated diene polymer based polyols, or the polyolefin polyols can include a polyisoprene polyol, a polybutadiene polyol, a poly(butadiene/isoprene) polyol, a poly(butadiene/acrylonitrile) polyol, a poly(butadiene/styrene) polyol, and a hydrogenated product thereof, prepared by polymerizing a conjugated diene such as butadiene or isoprene, or a conjugated diene and another monomer, by a living polymerization method, or the like in the presence of a polymerization initiator, followed by a reaction with an epoxy compound. One or more of these conjugated diene polymer based polyols, or the polyolefin polyols can be used.

The number average molecular weight of the high polymer polyol preferably falls within the range of 500 to 10,000. By using the block copolymer (II) having a polymer block (2) made of the high polymer polyol with such a number average molecular weight, a thermoplastic polymer composition having excellent properties such as non-tackiness, flexibility, mechanical properties and melt-moldability can be obtained with reliability. The number average molecular weight of the high polymer polyol is in the range of more preferably 700 to 8,000, and still more preferably 800 to 5,000. Here, the number average molecular weight of the high polymer polyol referred to in this specification means the number average molecular weight based on its hydroxyl value as measured in accordance with JIS K-1577.

The chain extender which constitutes the polymer block (2) can include ones conventionally used for the preparation of a polyurethane. Preferred chain extender is a compound having a molecular weight of not more than 400 and having two or more active hydrogen atoms capable of reacting with isocyanate group.

The chain extender can include, for example, diols such as ethylene glycol, propylene glycol, 1,4-butanediol, 1,6-hexanediol, 2-methyl-1,3-propanediol, 2,2-diethyl-1,3-propanediol, 2-butyl-2-ethyl-1,3-propanediol, 1,3-butanediol, 2-methyl-1,4-butanediol, neopentyl glycol, 3-methyl-1,5-pentanediol, 2,4-diethyl-1,5-pentanediol, 2-ethyl-1,3-hexanediol, 2-methyl-1,8-octanediol, 2,7-dimethyl-1,8-octanediol, 2-methyl-1,9-nonanediol, 2,8-dimethyl-1,9-nonanediol, 1,4-bis(β-hydroxyethoxy)benzene, 1,4-cyclohexanediol, bis(β-hydroxyethyl)terephthalate, xylylene glycol, 1,4-cyclohexanedimethanol, 1,4- or 1,5-cyclooctanedimethanol and 3(or 4), 8(or 9)-dihydroxymethyltricyclo[$5.2.1.0^{2,6}$]decane; diamines such as hydrazine, ethylenediamine, propylenediamine, xylylenediamine, isophorone diamine, piperazine, piperazine derivatives, phenylenediamine, toluylenediamine, adipic acid dihydrazide and isophthalic acid dihydrazide; aminoalcohols such as aminoethyl alcohol and aminopropyl alcohol; and so on. One or more of these chain extenders can be used. Among them, the preferred chain extender is an aliphatic diol having 2 to 12 carbon atoms, and the more preferred chain extender is 1,4-butanediol, 3-methyl-1,5-pentanediol, 2-methyl-1,8-octanediol or 1,9-nonanediol.

In addition, by using a branched aliphatic diol having a number average molecular weight of 100 to 400 as a chain extender, a thermoplastic polymer composition having excellent vibration damping properties which show large loss tangent value at about ordinary temperature and maintain large loss tangent value over a broad temperature range can be obtained. The preferred branched aliphatic diol is the one having 5 to 12 carbon atoms and a methyl group as a side chain.

The organic diisocyanate which constitutes the polymer block (2) can include ones conventionally used for the preparation of a polyurethane. Examples of the organic diisocyanate include aromatic diisocyanates such as 4,4'-diphenylmethane diisocyanate, tolylene diisocyanate, phenylene diisocyanate, xylylene diisocyanate, 1,5-naphthylene diisocyanate and 3,3'-dichloro-4,4'-diphenylmethane diisocyanate; aliphatic or alicyclic diisocyanates such as hexamethylene diisocyanate, isophorone diisocyanate, 4,4'-methylenebis(cyclohexyl isocyanate) and hydrogenated xylylene diisocyanate; and so on. One or more of these organic diisocyanates can be used. Among them, the preferred organic diisocyanate is 4,4'-diphenylmethane diisocyanate.

The amount of the high polymer polyol, the chain extender and the organic diisocyanate which constitute the polymer block (2) is preferably adjusted such that the content of nitrogen atom derived from the organic diisocyanate is in the range of 1 to 6.5% by weight based on the total weight of the high polymer polyol, the chain extender and the organic diisocyanate. By using the block copolymer (II) having a polymer block (2) in which the content of nitrogen atom derived from the organic diisocyanate is set within the above-described range, a thermoplastic polymer composition having excellent properties such as non-tackiness, flexibility, mechanical properties and melt-moldability can be obtained. In the polymer block (2), the content of the nitrogen atom derived from the organic diisocyanate falls more preferably between 1 and 6% by weight, still more preferably between 1.3 and 5.5% by weight, and the most preferably between 1.6 and 5% by weight, based on the total weight of the high polymer polyol, the chain extender and the organic diisocyanate.

The number average molecular weight of the polymer block (2) falls preferably between 200 and 300,000. By using the block copolymer (II) having a polymer block (2) with such a number average molecular weight, a thermoplastic polymer composition having excellent properties such as non-tackiness, flexibility, mechanical properties and melt-moldability can be obtained. The number average molecular weight of the polymer block (2) is in the range of more preferably 500 to 150,000, and still more preferably 1,000 and 100,000.

The hardness of the polymer block (2) falls preferably between 30 and 99, expressed in the JIS A hardness of the polyurethane corresponding to the polymer block (2). By using the block copolymer (II) having a polymer block (2) with such hardness, a thermoplastic polymer composition having excellent properties such as non-tackiness, flexibility, mechanical properties and melt-moldability can be obtained. The JIS A hardness of the polyurethane corresponding to the polymer block (2) is more preferably between 45 and 97, and still more preferably between 60 and 95.

The block copolymer (II) can be obtained, for example, by effecting a polyurethane forming reaction under the presence of a block copolymer, which may be referred to as "functionality block copolymer" hereinafter, having a structure corresponding to the polymer block (1) and a functional group reactive with a component of the polymer block (2). That is, the block copolymer (II) can be obtained by forming the polymer block (2) of a polyurethane on the polymer chain of a block copolymer, which may be hydrogenated, having an aromatic vinyl compound polymer block (a-1) and a conjugated diene polymer block (b-1), and having a functional group reactive with a component such as an organic diisocyanate, a chain extender or a high polymer polyol. In addition, the block copolymer (II) can also be obtained by subjecting a functionality block copolymer and a polyurethane having a structure corresponding to the polymer block (2).

Examples of the functional group which is contained in the functionality block copolymer and which is reactive with a component of the polymer block (2) can include, for example, ones reactive with a high polymer polyol and/or a chain extender, such as carboxyl group, acid anhydride group, thiocarboxyl group, isocyanate group, and so on; and ones reactive with an organic diisocyanate, such as hydroxyl group, amino group, mercapto group, carboxyl group, acid anhydride group, thiocarboxyl group, isocyanate group, and so on. The functionality block copolymer can contain one or more of these functional groups.

The functionality block copolymer has preferably a functional group reactive with an organic diisocyanate. The more preferred functional group is hydroxyl group, because a homogeneous polyurethane forming reaction can be conducted upon the preparation of the block copolymer (II).

The functional group reactive with a component of the polymer block (2) can locate preferably on a terminal of the functionality block copolymer. When a functionality block copolymer having such a functional group on a terminal of the molecule is used, the functional group can participate in the extension of main chain structure by polyurethane forming reaction upon the preparation of the block copolymer (II). By using the block copolymer (II) thus obtained, a thermoplastic polymer composition having excellent properties such as non-tackiness, flexibility, mechanical properties and melt-moldability can be obtained with reliability.

The average number of the functional group reactive with a component of the polymer block (2) is preferably not less than 0.6, more preferably not less than 0.7, and still more preferably between 0.7 and 1, per a molecule of the functionality block copolymer.

The functionality block copolymer can be prepared by an ionic polymerization such as an anionic polymerization or a cationic polymerization; a single site polymerization, a radical polymerization or the like. For example, the functionality block copolymer can be prepared by the procedures, in which an anionic polymerization is employed, comprising successively polymerizing an aromatic vinyl compound and a conjugated diene in an inert organic solvent such as n-hexane or cyclohexane using an alkyl lithium compound as a polymerization initiator, adding a compound having an oxirane skeleton such as ethylene oxide, propylene oxide or styrene oxide; or a lactone such as ε-caprolactone, β-propiolactone, dimethylpropiolactone [pivalolactone] or methylvalerolactone when the desired molecular structure and the desired molecular weight are obtained, and then adding an active hydrogen-containing compound such as an alcohol, a carboxylic acid or water to terminate the polymerization. Then the obtained functionality block copolymer is preferably hydrogenated in an inert organic solvent such as n-hexane or cyclohexane under the presence of a hydrogenation catalyst such as a Ziegler catalyst consisting an alkylaluminum compound and cobalt or nickel at a reaction temperature of 20 to 150° C. and at a hydrogen pressure of 1 to 150 kg/cm$^2$. In addition, the functionality block copolymer, before or after hydrogenation, may be optionally modified with maleic anhydride, and so on. The functionality block copolymer and/or the hydrogenated product thereof may contain, depending on the preparation method thereof, a block copolymer having an aromatic vinyl compound polymer block, a conjugated diene polymer block and no functional group described above.

As the functionality block copolymer, commercially available ones can be used.

The number average molecular weight of the functionality block copolymer is in the range of preferably 15,000 to 300,000, and more preferably 20,000 to 100,000. Here, the number average molecular weight of the functionality block copolymer is a value obtained by gel permeation chromatography [GPC], based on the standard polystyrene calibration curve.

The MFR [melt flow rate] of the functionality block copolymer, when measured at 230° C. under the load of 2.16 kg, falls preferably between 0.01 and 100 g/10 minutes. By using a functionality block copolymer having such an MFR value, a thermoplastic polymer composition having excellent properties such as non-tackiness, melt-moldability and melt-adhesiveness can be obtained. The MFR [melt flow rate] of the functionality block copolymer, when measured at 230° C. under the load of 2.16 kg, falls more preferably between 0.05 and 80 g/10 minutes. Here, the MFR value of the functionality block copolymer is measured in accordance with ASTM D-1238.

The polymer block (2) or a polyurethane corresponding to the polymer block (2) can be formed with the above-described high polymer polyol, the chain extender and the organic diisocyanate by a conventional polyurethane forming reaction.

In the formation of the polymer block (2) or a polyurethane corresponding to the polymer block (2), each component is employed preferably in amounts such that the isocyanate group of the organic diisocyanate is present by a ratio of 0.9 to 1.3 moles per 1 mole of the total active hydrogen atoms of the high polymer polyol and the chain extender. By using a block copolymer (II) having the polymer block (2) prepared by a high polymer polyol, a chain extender and an organic diisocyanate with the above-described ratio, a thermoplastic polymer composition having more excellent properties such as non-tackiness, flexibility, mechanical properties and melt-moldability can be obtained.

Also, in the formation of the polymer block (2) or a polyurethane corresponding to the polymer block (2), it is preferable to use each component in amounts such that the content of nitrogen atom derived from the organic diisocyanate is in the range of 1 to 6.5% by weight based on the total weight of the high polymer polyol, the chain extender and the organic diisocyanate. By using a block copolymer (II) having the polymer block (2) formed of a high polymer polyol, a chain extender and an organic diisocyanate in the above-described ratio, a thermoplastic polymer composition having excellent properties such as non-tackiness, flexibility, mechanical properties and melt-moldability can be obtained. The each component is used in amounts such that the content of nitrogen atom derived from the organic diisocyanate falls more preferably between 1 and 6% by weight, still more preferably between 1.3 and 5.5% by weight, and the most preferably between 1.6 and 5% by weight, based on the total weight of the high polymer polyol, the chain extender and the organic diisocyanate.

The block copolymer (II) can be easily and preferably prepared by (A) the reaction of a functionality block copolymer, a high polymer polyol, a chain extender and an organic diisocyanate, or (B) the reaction of a functionality block copolymer and a reaction product of a high polymer polyol, a chain extender and an organic diisocyanate.

With respect to the method (B), the reaction product can include a reaction mixture of a high polymer polyol, a chain extender and an organic diisocyanate, which may be further subjected to work up with the conventional process. Also, commercially available polyurethanes may be used as the reaction product so long as they are prepared from a high polymer polyol, a chain extender and an organic diisocyanate.

The reaction product of a high polymer polyol, a chain extender and an organic diisocyanate can contain, in addition to polyurethane produced therefrom, the unreacted high polymer polyol, the unreacted chain extender and the unreacted organic diisocyanate according to the amounts of the reactants, degree of conversion, other reaction conditions, and so on. In this case, the reaction between a functionality block copolymer and a polyurethane produced from a high polymer polyol, a chain extender and an organic diisocyanate, and the reaction between a functionality block copolymer, a high polymer polyol, a chain extender and an organic diisocyanate proceed simultaneously.

When the block copolymer (II) is produced by the method (A), the weight ratio of a functionality block copolymer based on the sum of a high polymer polyol, a chain extender and an organic diisocyanate ([the weight of a functionality block copolymer]:[the total weight of a high polymer polyol, a chain extender and an organic diisocyanate]) is in the range of preferably 5:95 to 95:5, more preferably 10:90 to 90:10, still more preferably 20:80 to 80:20, and the most preferably 30:70 to 70:30.

Also, when the block copolymer (II) is produced by the method (B), the weight ratio of a functionality block copolymer based on a reaction product of a high polymer polyol, a chain extender and an organic diisocyanate ([the weight of a functionality block copolymer]:[the weight of a reaction product of a high polymer polyol, a chain extender and an organic diisocyanate]) is in the range of preferably 5:95 to 95:5, more preferably 10:90 to 90:10, still more preferably 20:80 to 80:20, and the most preferably 30:70 to 70:30.

Upon the preparation of the block copolymer (II), a catalyst for polyurethane forming reaction can be used. Such catalyst for polyurethane forming reaction include organic tin compounds such as dibutyltin diacetate, dibutyltin dilaurate and dibutyltin bis(ethoxybutyl 3-mercaptopropionate); titanic acid; organic titanium compounds such as tetraisopropyl titanate, tetra-n-butyl titanate, polyhydroxytitanium stearate and titanium acetylacetonate; tertiary amines such as triethylene diamine, N-methylmorpholine, N,N,N',N'-tetramethylethylenediamine, N,N,N',N'-tetramethylhexamethylene diamine, triethylamine and N,N-dimethylaminoethanol; and so on.

The amount of the catalyst for polyurethane forming reaction falls preferably between 0.1 ppm and 0.2% by weight, more preferably between 0.5 ppm and 0.02% by weight, and still more preferably between 1 ppm and 0.01% by weight, based on the total weight of the functionality block copolymer, the high polymer polyol, the chain extender and the organic diisocyanate, or based on the total weight of the functionality block copolymer and the reaction product of the high polymer polyol, the chain extender and the organic diisocyanate.

Upon the preparation of the block copolymer (II), the catalyst for polyurethane forming reaction can be mixed with one or more of the functionality block copolymer, the high polymer polyol, the chain extender, the organic diisocyanate and the reaction product of the high polymer polyol, the chain extender and the organic diisocyanate. In the more preferred embodiments, the catalyst for polyurethane forming reaction is mixed with the high polymer polyol.

When the block copolymer (II) is produced in the presence of a catalyst for polyurethane forming reaction, it is desirable to add a deactivator of the catalyst for polyurethane forming reaction to the obtained block copolymer (II). Examples of the deactivator can include phosphorus compounds such as lauryl phosphate, oleyl phosphate, stearyl phosphate, dilauryl phosphate, dioleyl phosphate, distearyl phosphate, tris(2-ethylhexyl) phosphate, bis(octadecyl) pentaerythritol diphosphate, diethyl phenylphosphonate and diethyl 3,5-di-tert-butyl-4-hydroxybenzylphosphonate; and phenolic compounds such as 2,2'-methylenebis(6-tert-butyl-4-methylphenol), 2,2'-methylenebis(6-tert-butyl-4-ethylphenol), 2-hydroxy-4-benzyloxybenzophenone, 2-(3',5'-di-tert-butyl-2'-hydroxyphenyl)benzotriazole, 2-[2-hydroxy-3,5-bis(α,α-dimethylbenzyl)phenyl]-2H-benzotriazole and 4,4'-dioctyl-2,2'-biphenol. The preferred deactivator is a phosphorus compound.

The amount of the deactivator of the catalyst for polyurethane forming reaction falls preferably between 1 ppm and 2% by weight, more preferably between 5 ppm and 0.2% by weight, and still more preferably between 10 ppm and 0.1% by weight, based on the total weight of the functionality block copolymer, the high polymer polyol, the chain extender and the organic diisocyanate, or based on the total weight of the functionality block copolymer and the reaction product of the high polymer polyol, the chain extender and the organic diisocyanate.

The block copolymer (II) can be prepared according to the conventional urethane forming techniques. The block copolymer (II) can be prepared by either "prepolymer process" or "one-shot process".

The block copolymer (II) is preferably prepared substantially without the presence of any solvent. The block copolymer (II) is preferably prepared by melt kneading with a machine such as a single-screw extruder, a twin-screw extruder, a kneading machine and a Banbury mixer. The conditions for melt kneading are properly determined on account of the species of the raw material or the kind of the machine employed. The melt kneading is, in general, conducted at a temperature of 180 to 260° C. for 1 to 15 minutes.

Specific examples of the reaction used for forming polyurethane can include the following procedures [1] to [8].

[1] A functionality block copolymer, a high polymer polyol and a chain extender are mixed, for example, while heating at the temperature of 40 to 100° C. An organic diisocyanate is added to the resulting mixture in amounts such that the molar ratio of the isocyanate groups based on the active hydrogen atoms falls preferably between 0.9 and 1.3, followed by stirring for a short time. Then, the resulting mixture is heated, for example, at the temperature of 80 to 200° C.

[2] A functionality block copolymer, a high polymer polyol, a chain extender and an organic diisocyanate are mixed in amounts such that the molar ratio of the isocyanate groups based on the active hydrogen atoms falls preferably between 0.9 and 1.3. Then, the resulting mixture is kneaded, for example, at the temperature of 180 to 260° C. to effect the polyurethane formation.

[3] A high polymer polyol, a chain extender and an organic diisocyanate are continuously fed into an extruder such as a multi-screw extruder and heated, for example, at the temperature of 90 to 260° C. A functionality block copolymer is continuously fed into the heated mixture at a rate such that the molar ratio of the isocyanate groups based on the active hydrogen atoms falls preferably between 0.9 and 1.3, and continuously melt-polymerized at the temperature of, for example, 180 to 260° C.

[4] A functionality block copolymer, a high polymer polyol, a chain extender and an organic diisocyanate are continuously fed into an extruder such as a multi-screw extruder at a rate such that the molar ratio of the isocyanate groups based on the active hydrogen atoms falls preferably between 0.9 and 1.3, and continuously melt-polymerized at the temperature of, for example, 180 to 260° C.

[5] A high polymer polyol, a chain extender and an organic diisocyanate are continuously fed into an extruder such as a multi-screw extruder and heated, for example, at the temperature of 90 to 260° C. to effect the polyurethane formation. A functionality block copolymer is continuously added to the polyurethane and continuously melt-polymerized at the temperature of, for example, 180 to 260° C.

[6] A high polymer polyol, a chain extender and an organic diisocyanate are kneaded, for example, at the temperature of 180 to 260° C. to effect the polyurethane formation. A functionality block copolymer is added to the polyurethane and kneaded, for example, at the temperature of 180 to 260° C. to effect their reaction.

[7] A functionality block copolymer and a polyurethane, which may be commercially available, are continuously fed into an extruder such as a multi-screw extruder and reacted at the temperature of, for example, 180 to 260° C.

[8] A functionality block copolymer, a high polymer polyol, a chain extender and an organic diisocyanate are added to an organic solvent in amounts such that the molar ratio of the isocyanate groups based on the active hydrogen atoms falls preferably between 0.9 and 1.3, to effect the polyurethane formation.

The polymer composition, which may be referred to as "block copolymer composition" hereinafter, obtained by the reaction of the functionality block copolymer, the high polymer polyol, the chain extender and the organic diisocyanate, or by the reaction of the functionality block copolymer and the reaction product of the high polymer polyol, the chain extender and the organic diisocyanate, according to the above-described methods, can contain the unreacted functionality block copolymer, the unreacted high polymer polyol, the unreacted chain extender or the unreacted organic diisocyanate in addition to the block copolymer (II). The amounts of these compounds are varied according to the reaction conditions such as a ratio of the reactants and reaction temperature.

The block copolymer composition may contain a polyurethane formed by the high polymer polyol, the chain extender and the organic diisocyanate. In addition, the block copolymer composition, depending on the production process of the functionality block copolymer, can contain a block copolymer having an aromatic vinyl compound polymer block, a conjugated diene polymer block and no functional group, the profiles of which are the same as those of the polymer block (1).

The block copolymer (II) can be obtained, for example, by the procedures of (i) subjecting the block copolymer composition, which may be optionally pelletized and pulverized into appropriate size, to the treatment with a good solvent for polyurethane such as dimethylformamide in order to remove polyurethane which is produced from a high polymer polyol, a chain extender and an organic diisocyanate, and unreacted with the functionality block copolymer [in case such a polyurethane is present in the block copolymer composition], and the treatment with a good solvent for functionality block copolymer such as cyclohexane in order to extract and remove the unreacted functionality block copolymer and a block copolymer corresponding to the polymer block (1) [in case such block copolymers are present in the block copolymer composition], successively, and (ii) drying the remaining solid material.

In the present invention, the block copolymer composition can be employed, as it is, for the preparation of the thermoplastic polymer composition as long as it does not depart from the scope of the invention.

The thermoplastic polymer composition of the present invention comprises the alkyl ester of (meth)acrylic acid copolymer (I) and the block copolymer (II) at a weight ratio to meet the following equation (1).

$$40/60 \leq Wb/Wa \leq 99.9/0.1 \qquad (1)$$

;wherein Wa means the weight of the alkyl ester of (meth)acrylic acid copolymer (I) and Wb means the weight of the block copolymer (II).

When the amount of the block copolymer (II) is less than the above-described range, the properties of the thermoplastic polymer composition such as non-tackiness, flexibility, mechanical properties and melt-moldability are reduced. On the other hand, when the amount of the block copolymer (II) is more than the above-described range, it is difficult to produce a thermoplastic polymer composition having good melt-moldability.

The weight ratio [Wb/Wa] of the alkyl ester of (meth) acrylic acid copolymer (I) and the block copolymer (II) is in the range of preferably 75/25 to 99.5/0.5, and more preferably 80/20 to 99/1.

The thermoplastic polymer composition of the present invention can contain a thermoplastic polyurethane (III). When a thermoplastic polyurethane (III) is contained, the thermoplastic polymer composition of the present invention may have more improved properties such as non-tackiness, flexibility and melt-moldability. As the thermoplastic polyurethane (III), there can be used those prepared from the reaction of the above-described high polymer polyol, the chain extender and the organic diisocyanate, which is not limited to the polyurethane produced upon the preparation of the block copolymer (II). With respect to the thermoplastic polyurethane (III), the content of nitrogen atom derived from the organic diisocyanate falls preferably between 1 and 6.5% by weight, more preferably between 1 and 6% by weight, still more preferably 1.3 and 5.5% by weight, and the most preferably between 1.6 and 5% by weight, based on the total weight of the high polymer polyol, the chain extender and the organic diisocyanate.

The number average molecular weight of the thermoplastic polyurethane (III) falls preferably between 200 and 300,000, more preferably between 500 and 150,000, and still more preferably between 1,000 and 100,000. In addition, the JIS A hardness of the thermoplastic polyurethane (III) falls preferably between 30 and 99, more preferably between 45 and 97, and still more preferably between 60 and 95.

The amount of the thermoplastic polyurethane (III) is in the range of preferably 1 to 1000 parts by weight, more preferably 1 to 750 parts by weight, and still more preferably 1 to 500 parts by weight, based on 100 parts by weight of the total weight of the alkyl ester of (meth)acrylic acid copolymer (I) and the block copolymer (II).

The thermoplastic polymer composition of the present invention can contain a block copolymer (IV), which may be hydrogenated, having an aromatic vinyl compound polymer block (a-2) and a conjugated diene polymer block (b-2), which may be referred to as "aromatic vinyl compound block copolymer (IV)" hereinafter. When an aromatic vinyl compound block copolymer (IV) is contained, the thermoplastic polymer composition of the present invention may have more improved properties such as non-tackiness, flexibility and melt-moldability. Such an aromatic vinyl compound block copolymer (IV) is not limited to those derived from the functionality block copolymer used in the preparation of the block copolymer (II), and can include a block copolymer of an aromatic vinyl compound, a conjugated diene and another monomer copolymerizable with these.

With respect to the aromatic vinyl compound block copolymer (IV), the content of the structural unit derived from the aromatic vinyl compound is preferably in the range of 5 to 90% by weight, more preferably 10 to 90% by weight, and still more preferably 20 to 80% by weight, based on the total structural unit of the aromatic vinyl compound block copolymer (IV). In addition, in the aromatic vinyl compound block copolymer (IV), the number average molecular weight of the aromatic vinyl compound polymer block (a-2) and that of the conjugated diene polymer block (b-2) are not particularly limited, but the number average molecular weight of the aromatic vinyl compound polymer block (a-2) preferably ranges from 2,500 to 100,000, and the number average molecular weight of the conjugated diene polymer block (b-2) preferably ranges from 10,000 to 250,000 before hydrogenation. Also, the number average molecular weight of the aromatic vinyl compound block copolymer (IV) is in the range of preferably 15,000 to 500,000, and more preferably 20,000 to 300,000, before hydrogenation. Here, the number average molecular weight of the aromatic vinyl compound block copolymer (IV) is a value obtained by gel permeation chromatography [GPC], based on the standard polystyrene calibration curve.

In the aromatic vinyl compound block copolymer (IV), the conjugated diene polymer block (b-2) may be hydrogenated partially or entirely. In this case, the hydrogenation ratio of the conjugated diene polymer block is preferably 50 mol % or more, more preferably 60 mol % or more, and still more preferably 80 mol % or more, from the viewpoint of heat resistance, weatherability and light resistance.

In the aromatic vinyl compound block copolymer (IV), the bonding form of the aromatic vinyl compound polymer block (a-2) and the conjugated diene polymer block (b-2) may be linear, branched, radial or mixed type thereof. Preferably, they are bonded in linear form. The aromatic vinyl compound block copolymer (IV) has preferably a structure in which two or more of the aromatic vinyl compound polymer blocks and one or more of the conjugated diene blocks are bonded in linear form, and has more preferably a tri-block structure in which two aromatic vinyl compound polymer blocks and one conjugated diene block are bonded in linear form.

The aromatic vinyl compound block copolymer (IV) may have, on a terminal or in a molecular chain, a functional group such as hydroxyl group, carboxyl group, acid anhydride group, epoxy group, amino group, a halogen atom or mercapto group. The MFR [melt flow rate] value of the aromatic vinyl compound block copolymer (IV), when measured at 230° C. under the load of 2.16 kg, is preferably not more than 100 g/10 minutes, more preferably not more than 50 g/10 minutes, and still more preferably not more than 30 g/10 minutes. Here, the MFR value of the aromatic vinyl compound block copolymer (IV) is measured in accordance with ASTM D-1238. In addition, the JIS A hardness of the aromatic vinyl compound block copolymer (IV) falls preferably between 30 and 95, more preferably between 40 and 90, and still more preferably between 50 and 85. Here, the JIS A hardness of the aromatic vinyl compound block copolymer (IV) is measured in accordance with JIS K-6253.

The amount of the aromatic vinyl compound block copolymer (IV) is in the range of preferably 1 to 1000 parts by weight, more preferably 1 to 750 parts by weight, and still more preferably 1 to 500 parts by weight, based on 100 parts by weight of the total weight of the alkyl ester of (meth) acrylic acid copolymer (I) and the block copolymer (II).

The thermoplastic polymer composition of the present invention can optionally contain a paraffin oil (V) within the extent where effects of the invention is retained.

As the paraffin oil (V), ones containing 60% by weight or more of a paraffin ingredient [a linear hydrocarbon] are generally used. The preferred oil is the one containing 80% by weight or more of paraffin ingredients. The paraffin oil (V) can contain an ingredient having an aromatic ring such as benzene ring or naphthalene ring.

The dynamic viscosity measured at 40° C. of the paraffin oil (V) is in the range of preferably 20 to 800 cSt [$mm^2/s$].

When a paraffin oil (V) having such a dynamic viscosity is contained, the thermoplastic polymer composition of the present invention may have more improved properties such as non-tackiness, flexibility and melt-moldability. The dynamic viscosity measured at 40° C. of the paraffin oil (V) is in the range of more preferably 50 to 600 cSt [mm$^2$/s]. Here, the dynamic viscosity of the paraffin oil (V) is measured in accordance with JIS K-2283.

Also, the current point of the paraffin oil (V) is in the range of preferably −40 to 0° C. When a paraffin oil (V) having such a current point is contained, the thermoplastic polymer composition of the present invention may have more improved properties such as non-tackiness, flexibility and melt-moldability. The current point of the paraffin oil (V) is in the range of more preferably −30 to 0° C. Here, the current point of the paraffin oil (V) is measured in accordance with JIS K-2269.

In addition, the flash point of the paraffin oil (V) is in the range of preferably 200 to 400° C. When a paraffin oil (V) having such a flash point is contained, the thermoplastic polymer composition of the present invention may have more improved properties such as non-tackiness, flexibility and melt-moldability. The flash point of the paraffin oil (V) is in the range of more preferably 250 to 350° C. Here, the flash point of the paraffin oil (V) is measured in accordance with JIS K-2265.

By using a paraffin oil (V), a thermoplastic polymer composition having more improved non-tackiness, flexibility and melt-moldability can be obtained. Further, by using a paraffin oil (V) together with the above-described aromatic vinyl compound block copolymer (IV), the resulting thermoplastic polymer composition shows extremely excellent flexibility and no migration of the paraffin oil (V).

The amount of the paraffin oil (V) is in the range of preferably 1 to 1000 parts by weight, more preferably 1 to 750 parts by weight, and still more preferably 1 to 500 parts by weight, based on 100 parts by weight of the total weight of the alkyl ester of (meth)acrylic acid copolymer (I) and the block copolymer (II).

The thermoplastic polymer composition of the present invention may contain, if desired, all of the above-described thermoplastic polyurethane (III), the aromatic vinyl compound block copolymer (IV) and the paraffin oil (V). In such a case, they are preferably used at a weight ratio, including the weight [Wa] of the alkyl ester of (meth)acrylic acid copolymer (I) and that [Wb] of the block copolymer (II), to meet the following equations (2) to (5).

$$5/100 \leq Wb/Wd \leq 200/100 \quad (2)$$

$$10/100 \leq We/Wd \leq 300/100 \quad (3)$$

$$5/100 \leq Wc/Wd \leq 300/100 \quad (4)$$

$$1/100 \leq Wa/(Wb+Wc+Wd+We) \leq 20/100 \quad (5)$$

; wherein Wc means the weight of the thermoplastic polyurethane (III), Wd means the weight of the aromatic vinyl compound block copolymer (IV) and We means the weight of the paraffin oil (V).

The weight ratio [Wa/(Wb+Wc+Wd+We)] of the alkyl ester of (meth)acrylic acid copolymer (I), the block copolymer (II), the thermoplastic polyurethane (III), the paraffin oil (V) and the aromatic vinyl compound block copolymer (IV) is in the range of preferably 2/100 to 18/100, and more preferably 3/100 to 16/100.

The thermoplastic polymer composition of the present invention can optionally contain various resins such as thermosetting polyurethane resins; polyamide resins; polyester resins; polyvinyl chloride resins; polyvinylidene chloride resins; polycarbonate resins; polyoxymethylene resins; saponified ethylene-vinyl acetate copolymers; copolymers of an aromatic vinyl compound and a vinyl compound having a cyano group; copolymers of an olefin, an aromatic vinyl compound and a vinyl compound having a cyano group; styrene-based polymers and olefin-based polymers, within the extent where effects of the invention is retained.

In addition, the thermoplastic polymer composition of the present invention can optionally contain an additional component, examples of which include metallic soaps such as calcium stearate, zinc stearate, barium stearate, cadmium stearate and lead stearate; inorganic stabilizers such as dibasic sulfates, dibasic lead stearate, calcium hydroxide and calcium silicate; additives such as lubricants, pigments, impact modifiers, processing materials, nucleating agents, reinforcing agents, colorants, flame retardants, weatherability modifiers, ultraviolet absorbents, antioxidants, hydrolysis inhibitors, antifungal agents, light stabilizers, antistatic agents, a silicone oil, anti-blocking agents, mold release agents, foaming agents and perfumes; fibers such as glass fibers and polyester fibers; fillers such as talc, silica and wood powder; various coupling agents, and the like.

The thermoplastic polymer composition of the present invention can be produced by a process in which the above-described components can be uniformly blended. Among them, a melt kneading process is simple and preferred.

The thermoplastic polymer composition of the present invention can be produced by, for example, melt kneading the respective components with a melt kneading machine such as a single-screw extruder, a twin-screw extruder, a kneading machine, a mixing roll or a Banbury mixer, generally at a temperature of 120 to 220° C. for about 30 seconds to 5 minutes.

The blending sequence of the respective components has no particular restriction on melt kneading. The thermoplastic polymer composition of the present invention can be prepared by (i) feeding the alkyl ester of (meth)acrylic acid copolymer (I) and the block copolymer (II) [or the above-described block copolymer composition] simultaneously into a melt kneading machine for kneading, or by (ii) carrying out the production of the block copolymer (II) [or the above-described block copolymer composition] by melt kneading, followed by the addition of the alkyl ester of (meth)acrylic acid copolymer (I) for melt kneading. In addition, the thermoplastic polymer composition of the present invention can be prepared by carrying out the production of the block copolymer (II) [or the above-described block copolymer composition] in the presence of the alkyl ester of (meth)acrylic acid copolymer (I).

The thermoplastic polyurethane (III), the aromatic vinyl compound block copolymer (IV), the paraffin oil (V) and the above-described additional components may be blended during the preparation or after the preparation of the thermoplastic polymer composition comprising the alkyl ester of (meth)acrylic acid copolymer (I) and the block copolymer (II) [or the above-described block copolymer composition]. When they are blended during the preparation of the thermoplastic polymer composition comprising the alkyl ester of (meth)acrylic acid copolymer (I) and the block copolymer (II), the thermoplastic polyurethane (III), the aromatic vinyl compound block copolymer (IV), the paraffin oil (V) or the above-described additional components may be fed into a melt kneading machine for kneading separately from the alkyl ester of (meth)acrylic acid copolymer (I) or the block copolymer (II) [or the above-described block copolymer composition]. Alternatively, they can be fed into a melt kneading machine for kneading as a compound with at least one of the alkyl ester of (meth)acrylic acid copolymer (I) or the block copolymer (II) [or the above-described block copolymer composition]. In the preferred embodiments, they are fed into a melt kneading machine for kneading as a compound with the block copolymer (II) [or the above-described block copolymer composition].

The thermoplastic polymer composition in a molten state prepared by melt kneading may be molded in situ or may be pelletized before molding.

The thermoplastic polymer composition of the present invention can be subjected to a melt molding or a thermal processing. By using a thermoplastic polymer composition of the present invention, a variety of articles can be obtained smoothly by various molding methods such as extrusion molding, injection molding, press molding, blow molding, calender molding, casting, and so on. The thermoplastic polymer composition is non-tacky and excellent in handling property and melt-moldability such as melt-discharge stability. Therefore, the thermoplastic polymer composition of the present invention can be smoothly molded with significantly high productivity under wide ranges of molding conditions such as the type and capacity [discharge rate] of an extruder, production conditions and operation time [continuous operability]. In addition, the thermoplastic polymer composition of the present invention can give a molded article having excellent properties such as non-tackiness, flexibility and mechanical properties.

The molded articles comprising the thermoplastic polymer composition of the present invention encompass articles having various shapes such as films, sheets, tubes and three-dimensional forms. The molded articles can be used for a variety of applications such as parts of automobiles, parts of home electric appliances, parts of computers, parts of machines, packing, gaskets and hoses.

Further, the thermoplastic polymer composition of the present invention has excellent melt-adhesiveness and, therefore, can be firmly adhered, under its molten state, to various other materials including, for example, synthetic resins, rubbers, metals, woods, ceramics, paper, and fabrics. Thus, the thermoplastic polymer composition of the present invention can be effectively used, especially, for the production of composite articles, including laminate structures, composite structures and the like, with such other materials. There is no particular restriction on the kind of the other materials to which the thermoplastic polymer composition of the present invention is melt-adhered. Especially, the thermoplastic polymer composition of the present invention is excellent in melt-adhesiveness to the materials having polar character.

Examples of the above-described other materials include various synthetic resins such as polyurethane resins, polyamide resins, polyester resins, polycarbonate resins, polyphenylene sulfide resins, polyacrylate resins, polymethacrylate resins, polyether resins, polysulfone resins, acrylonitrile-styrene copolymers [AS resins], styrene-maleic anhydride copolymers [SMA resins], rubber reinforced polystyrenes [HIPS resins], acrylonitrile-butadiene-styrene copolymers [ABS resins], styrene-methyl methacrylate copolymers [MS resins], styrene-butadiene-methyl methacrylate copolymers [MBS resins], acrylonitrile-butadiene-styrene based copolymers, polyvinyl chloride resins, polyvinylidene chloride resins, vinyl chloride-vinyl acetate copolymers, polyvinylidene fluoride resins, phenol resins and epoxy resins; various synthetic rubbers such as isoprene rubbers, butadiene rubbers, styrene-butadiene rubbers, butadiene-acrylonitrile rubbers, chloroprene rubbers, butyl rubbers, urethane rubbers, silicone rubbers, fluorocarbon rubbers and acrylonitrile rubbers; various metals such as iron, aluminum and copper; various alloys such as stainless steels, tin plates and galvanized iron sheets; and the like.

The composite articles comprising the thermoplastic polymer composition of the present invention have no particular restriction on the number of layers, the thickness of each layer, the shape, the configuration and the like, which can be appropriately adjusted according to the intended purpose of the composite article and so on. Representative examples of the composite articles can include, but are not limited thereto, a composite article [a laminate structure] having one layer of the thermoplastic polymer composition of the present invention and one layer of another material, a composite article [a laminate structure] where two layers of the thermoplastic polymer composition of the present invention are laminated on both side of a layer of another material, a composite article [a laminate structure] having an inner layer of the thermoplastic polymer composition of the present invention between two outer layers of other materials, and a composite article [a laminate structure] having at least one layer of the thermoplastic polymer composition of the present invention and two or more of the layers of other materials. When the composite article has two or more of the layers of other materials, each material may be the same or different. In addition, when the composite article has two or more of the layers of the thermoplastic polymer composition of the present invention, each thermoplastic polymer composition of the present invention may be the same or different.

The composite articles comprising the thermoplastic polymer composition of the present invention and other materials can be produced by a process in which a melt-adhesiveness is utilized. Examples of the process for the production of the composite article include melt molding methods of injection moldings such as insert injection molding, two-color injection molding, core back injection molding, sandwich injection molding and injection press molding; extrusion moldings such as T-die laminate molding, co-extrusion molding and extrusion coating; blow molding; calender molding; press molding; melt casting and the like.

When the composite articles are produced by insert injection molding, the following process is generally employed. Namely, other material, previously prepared, having a prescribed shape and size is disposed in a mold, and the thermoplastic polymer composition of the present invention is injected therein to give a composite article having a member comprising the thermoplastic polymer composition of the present invention and a member comprising the other material. In this case, there is no particular restriction on the preparation method for the other material to be disposed in a mold. When the other material to be disposed in a mold is the material comprising a synthetic resin or a rubber, it may be prepared by various molding methods of, for example, injection molding, extrusion molding and successive cutting into a prescribed size, press molding and casting. Whereas, when the other material to be disposed in a mold is the material comprising a metal, it can be formulated into a prescribed shape and size by, for example, the methods generally applied for the manufacture of a metal product, such as casting, rolling, cutting, machining and grinding.

When the composite articles are produced by two-color injection molding, the following process is generally employed. Namely, the other material is injected into a mold to form a member, then the cavity plate is exchanged, for example, by the rotation or the movement of the mold, and the thermoplastic polymer composition of the present invention is injected into the gap between the member comprising the other material and the second mold plate to give a composite article. In this process, two or more of injection molding machines are employed.

Whereas, when the composite articles are produced by core back injection molding, the following process is generally employed. Namely, by the use of one injection molding machine and one mold, the other material is injected into the mold to form a member, then the cavity of the mold is enlarged, and the thermoplastic polymer composition of the present invention is injected therein to give a composite article.

Alternatively, the composite articles may be produced in the following manner. Namely, in the above-described injection moldings, the injection sequence of the components is exchanged. Thus, the thermoplastic polymer composition of the present invention is first injected into the mold to form a member, and the other material such as a thermoplastic resin is injected therein.

When the composite articles having a layer of the thermoplastic polymer composition of the present invention and a layer of another material are produced by extrusion moldings, the following processor the like is generally employed. Namely, the thermoplastic polymer composition of the present invention and the other material such as a thermoplastic resin are simultaneously melt-extruded and joined to each other, through a die [extrusion die portion, or the like] divided into not less than two parts, examples of which are the inner side and the outer side, the upper side and the lower side, or the left-hand side and the right-hand side. If the other material is not a thermoplastic material, the composite articles can be produced by extrusion coating of the thermoplastic polymer composition of the present invention to above or around the other material.

Further, when the composite articles are produced by calender molding, they can be produced by the calender coating of the thermoplastic polymer composition of the present invention at a molten state onto the other material which may be in the molten and plastic state, or in the solid state.

Still further, when the composite articles are produced by press molding, they can be produced by the melt pressing of the thermoplastic polymer composition of the present invention with the disposed other material.

The composite article comprising the thermoplastic polymer composition of the present invention and another material can be used for various kinds of industrial products and parts. Specific examples include various products, for example, interior trims for automobiles and vehicles such as instrument panels, center panels, center console boxes, door trims, pillars and assist grips; automobile exterior parts such as protector moldings; electrical household parts such as electrical machinery grips, door stops of the refrigerator, camera grips, bumpers of vacuum cleaners, remote control switches and knobs and various kinds of key tops of office automation equipments; products for underwater use such as swimming goggles and underwater camera covers; various kinds of cover parts; various industrial components with packing for the use of sealing, water proof property, sound insulation or vibration damping; automobile functional components such as rack & pinion boots, suspension boots, uniform velocity joint boots; electric and electronic parts such as curled cord wire coverings and soundless gears; belts; hoses; tubes; sports goods; building materials such as doors and window frames; various kinds of joints; valve parts and medical gypsum. In addition, a composite article having a layer comprising the thermoplastic polymer composition of the present invention on at least one surface thereof shows soft and good feeling upon contact, because the thermoplastic polymer composition has elastic character and flexibility. And such a composite article also has shock absorption [cushioning property] and excellent impact resistance, and, therefore, is excellent in safety.

The present inventor has also found that the thermoplastic polymer composition of the present invention has outstanding melt characteristics to produce a foam. By using the thermoplastic polymer composition of the present invention, various molded articles with a foam structure and composite articles having a member with a foam structure can be obtained easily and efficiently The term "foam" referred to in this specification hereinafter encompasses such a member with a foam structure which constitutes a composite article.

A foaming agent employed in the production of a foam using the thermoplastic polymer composition of the present invention includes a thermal decomposition type foaming agent, that is a chemical foaming agent, and a physical foaming agent, that is a foaming agent comprising an inert gas such as carbon dioxide, nitrogen or argon gas. The preferred foaming agent is a thermal decomposition type foaming agent.

Examples of the thermal decomposition type foaming agent (VI) employed in the present invention are organic thermal decomposition type foaming agents such as azodicarbonamide, 4,4'-oxybis(benzenesulfonyl hydrazide), p-toluenesulfonyl hydrazide, α,α'-azobisisobutyronitrile, 4,4'-diaminoazobenzene, azobis(cyclohexanecarbonitrile), barium azodicarboxylate, N,N'-dinitrosopentamethylenetetramine, N,N'-dinitroso-N,N'-dimethylterephthalamide, t-butylaminoacetonitrile and acetone p-toluenesulfonyl hydrazone; and inorganic thermal decomposition type foaming agents such as sodium bicarbonate and ammonium bicarbonate. One or more of these foaming agents can be used. Among them, azodicarbonamide is preferably used in the present invention, since it has a decomposition temperature not lower than the melting temperature of the thermoplastic polymer composition comprising the block copolymer (II) and the alkyl ester of (meth)acrylic acid copolymer (I) having a number average molecular weight of not less than 100,000, and an excellent handling property, what is more, it gives a large amount of gas and shows decomposition behavior suitable for the melt-molding of the thermoplastic polymer composition. Among the above-described thermal decomposition type foaming agents, azodicarbonamide, 4,4'-oxybis(benzenesulfonyl hydrazide), p-toluenesulfonyl hydrazide and sodium bicarbonate, for example, work to decrease the molecular weight of the polyurethane component. In contrast, N,N'-dinitrosopentamethylenetetramine, for example, works to accelerate the cross-linking of the polyurethane component. Accordingly, the combined use of a foaming agent which works to decrease the molecular weight of the polyurethane component with another foaming agent which works to accelerate the cross-linking of the polyurethane component can give an appropriate cross-linking on the polyurethane component and suppress the reduction of the melt viscosity. Thus, the resulting foam has favorable foam structure and is excellent in mechanical properties, physical properties and chemical properties.

The amount of the thermal decomposition type foaming agent (VI) can be set depending on, for example, the expansion ratio [specific gravity] and the use of the resulting foam and the amount of gas generated by the foaming agent, and falls preferably between 0.05 and 10 parts by weight, more preferably between 0.1 and 5 parts by weight and still more preferably between 0.3 and 3 parts by weight, based on 100 parts by weight of the total weight of the block copolymer (II) and the alkyl ester of (meth)acrylic acid copolymer (I).

Upon the preparation of a foam using the thermal decomposition type foaming agent (VI), a foaming auxiliary agent can be used together, in order to conduct a smooth foaming and to make a foam having more uniform and fine-celled foam structures. In such a case, a foaming auxiliary agent conventionally used with the respective thermal decomposition type foaming agent can be employed. For example, a metal carboxylate, a metal carbonate such as calcium carbonate, a metal oxide such as silica or alumina, and a mineral such as talc can be used as the foaming auxiliary agent in combination with an azo foaming agent, sodium bicarbonate or a hydrazine foaming agent. A urea compound or an organic acid can be used as the foaming auxiliary agent in combination with N,N'-dinitrosopentamethylenetetramine.

The amount of the foaming auxiliary agent, when used, can be appropriately set depending on, for example, the expansion ratio [specific gravity] and the use of the resulting foam and the amount of gas generated by the foaming agent, and falls preferably between 0.005 and 10 parts by weight, more preferably between 0.01 and 5 parts by weight, and still more preferably between 0.1 and 2 parts by weight, based on 100 parts by weight of the total weight of the block copolymer (II) and the alkyl ester of (meth)acrylic acid copolymer (I). The proportion of the foaming auxiliary agent to the thermal decomposition type foaming agent (VI) is preferably in the range of 0.1 to 1 part by weight based on 1 part by weight of the thermal decomposition type foaming agent (VI).

In addition, one or more of additives can be used in the production of a foam using the thermal decomposition type foaming agent (VI). Examples of such additives include foaming modifiers for forming uniform and fine-celled foam structures, such as inorganic fine particles; fillers; reinforcing agents; pigments; antioxidants; ultraviolet absorbents; plasticizers; antistatic agents; hydrolysis inhibitors; lubricants; and flame retardants.

In the preferred embodiments, the thermal decomposition type foaming agent (VI), and the optional foaming auxiliary agent and optional other additives are preliminarily mixed with the thermoplastic polymer composition of the present invention.

There is no restriction on the preparation method for the thermoplastic polymer composition of the present invention containing the thermal decomposition type foaming agent (VI) and an optional foaming auxiliary agent and optional other additives. Such thermoplastic polymer compositions can be prepared by, for example, premixing the block copolymer (II), the alkyl ester of (meth)acrylic acid copolymer (I), and the thermal decomposition type foaming agent (VI) as well as a foaming auxiliary agent and other components, if required, at the predetermined ratio with a vertical or horizontal mixer generally used for mixing resinous materials; and melt-kneading the premixture under heating with a single-screw or twin-screw extruder, mixing roll or Banbury mixer in a batch-wise or continuous manner.

The thermoplastic polymer composition of the present invention is thermoplastic and is molten by heating generally at about 150° C. to 250° C., while the melting temperature varies depending on the species and amounts of the block copolymer (II) and the alkyl ester of (meth)acrylic acid copolymer (I). In addition, the thermoplastic polymer composition of the present invention has melt characteristics suitable for foaming. Therefore, the thermoplastic polymer composition of the present invention can smoothly give, by melt-molding, a foam having, entirely, uniform and fine-celled foam structures with identical sizes, and having excellent mechanical properties, physical properties and appearance.

Examples of the method for producing a foam using the thermoplastic polymer composition of the present invention are as follows:

(1) a method in which the thermoplastic polymer composition of the present invention is formulated into an unfoamed molded article such as a film, a sheet, a fiber or a tube, and the resulting unfoamed molded article is subjected to foaming;

(2) a method in which the thermoplastic polymer composition of the present invention is subjected to molding and, simultaneously, foaming to give a molded article such as a film, a sheet, a fiber or a tube;

(3) a method in which the unfoamed molded article prepared in the above-described method (1) is subjected to secondary fabrication and, simultaneously, foaming;

(4) a method in which a composite article comprising an unfoamed member of the thermoplastic polymer composition of the present invention and a member of another material is prepared and, subsequently, subjected to foaming; and (5) a method in which the thermoplastic polymer composition of the present invention is subjected to foaming, simultaneously, upon compounding with a member of another material to give a composite article.

A variety of molded articles can be produced from the thermoplastic polymer composition of the present invention by melt-molding and thermal processing as mentioned above, examples of which include extrusion moldings, injection moldings, press moldings, blow moldings, calender moldings and castings.

In addition, a composite article can be produced from the thermoplastic polymer composition of the present invention by melt-molding method, examples of which include injection moldings described above such as insert injection moldings, two-color injection moldings, core back injection moldings, sandwich injection moldings and injection press moldings; extrusion moldings such as T-die laminate moldings, co-extrusion moldings and extrusion coatings; blow molding; calender moldings; press moldings, melt castings and the like.

When a foam comprising the thermoplastic polymer composition of the present invention is prepared, it is preferred to employ a melt-extrusion foaming, because an intended foam can be produced with good workability and high productivity without using an environmental pollution substance such as an organic solvent or a chlorofluorocarbon.

When the thermoplastic polymer composition of the present invention is subjected to molding and/or processing, accompanied with foaming, such foaming is effected at a temperature not lower than the decomposition temperature of the thermal decomposition type foaming agent in at least one step of the molding and processing procedures. While varying depending on the species of the thermal decomposition type foaming agent and an optional foaming auxiliary agent, the thermal decomposition type foaming agent is generally decomposed at a temperature in the range of about 100 to 250° C. Thus, to produce a foam by using a thermal decomposition type foaming agent, it is preferred to effect foaming at a temperature of about 100 to 250° C. or higher, according to the species of the thermal decomposition type foaming agent and the foaming auxiliary agent.

The foam thus prepared can be used as it is or as a composite with another material. Examples of the other materials include fabrics such as woven fabrics, knitted fabrics and nonwoven fabrics comprising a natural fiber, a synthetic fiber, a semisynthetic fiber or an inorganic fiber; papers; films, sheets, plates and other articles having other shapes, comprising a plastic or a rubber; foils, sheets, plates and other articles having other shapes comprising a metal; woods; and ceramics. The foam and another material can be compounded by a procedure such as melt bonding, thermocompression bonding or bonding with an adhesive.

The foam comprising the thermoplastic polymer composition of the present invention can be effectively used in a wide variety of applications, examples of which include artificial leathers; building materials such as wall materials and floor materials; furniture such as chairs; sheets of vehicles; interior materials for automobiles or vehicles; footwear, bags, pouches, clothing, dry goods, gloves, cushioning materials, heat-insulating materials, pads and lightweight belts.

Among them, a composite with a foam comprising the thermoplastic polymer composition of the present invention and a fibrous substrate is particularly useful. In addition, a foam comprising the thermoplastic polymer composition of the present invention can be used as a laminate structure having been laminated with a fibrous substrate and subsequently formed with a nonporous layer comprising a thermoplastic elastomer, which is arranged on or above the foam. Such a laminate structure is useful as a synthetic leather or an artificial leather, because it shows favorable properties of good feel, texture and appearance, which are very close to those of natural leather, due to the multiple nature elements of the three layers such as toughness of the fibrous substrate, flexibility and suitable elasticity of the foam, and smooth and soft feel, texture and touch of the nonporous layer.

The laminate structure, which is referred to as "three-layered laminate structure" hereinafter, having a fibrous substrate, a foam and a nonporous layer is illustrated below.

The fibrous substrate is not specifically limited, as long as it is a sheet-like fibrous substrate having an appropriate thickness, substantial texture and soft and flexible feel. Various fibrous materials conventionally used in the production of leather-like laminate structures can be used as the fibrous substrate. Such fibrous substrates include, but are not limited to, fibrous sheets such as entangled nonwoven sheets and knitted or woven sheets using, for example, ultrfine fibers or bundles thereof, special porous fibers, regular synthetic fibers, semisynthetic fibers, natural fibers, inorganic fibers and the like; fibrous sheets comprising the aforementioned fibrous sheet and a polymer material such as polyurethane contained therein; and fibrous sheets comprising any of these fibrous sheets and a porous coating layer of a polymer material arranged on the fibrous sheet.

Among them, a fibrous sheet formed from ultrafine fibers or bundles thereof is preferably used as the fibrous substrate. In such a case, the fineness of monofilament of the ultrafine fibers is preferably not more than 0.5 denier, and more preferably not more than 0.1 denier, in view of the feel and texture of the resulting three-layered laminate structure. In addition, when the fibrous substrate is formed from bundles of the ultrafine fibers, the total denier of the bundles is preferably in the range of 0.5 to 10 deniers, in view of the feel and texture of the resulting laminate structure. The ultrafine fibers, which constitute the fibrous substrate, are preferably made of a polyester fiber and/or a nylon fiber, in view of the strength, touch and cost for production of the resulting laminate structure.

The more preferred fibrous substrate is a fibrous sheet comprising a nonwoven fabric of the bundles of the ultrafine fibers impregnated with a polymer material, because a laminate structure having good feel, texture and touch, which is further close to those of a natural leather, can be obtained therefrom. In such a case, examples of the polymer material, impregnated into the nonwoven fabric, include polyurethane-based polymers, polyamide-based polymers, vinyl chloride-based polymers, poly(vinyl butyral)-based polymers, acrylic-based polymers, polyamino acid-based polymers and silicone-based polymers. One or more of these polymers can be used. Among them, a fibrous sheet impregnated with a polyurethane-based polymer is especially preferable as the fibrous substrate, since the fibrous substrate has high affinity for the foam of the thermoplastic polymer composition of the present invention, which is arranged thereon, and can be firmly bonded with the foam. The content of the polymer material impregnated in the fibrous sheet is preferably in the range of about 10 to 70% by weight based on the weight of the fibrous sheet before impregnation.

Further, a coating layer of a finishing agent containing a polymer with high affinity for the foam may be formed on the fibrous substrate, in order to improve adhesion strength between the fibrous substrate and the foam. In this case, the thickness of the coating layer is set preferably not more than 5 µm.

The thickness of the fibrous substrate can be set, depending on, for example, the use of the resulting laminate structure and falls preferably between about 0.3 and 3 mm, and more preferably between about 0.5 and 2 mm, in view of good balance with the thickness of the foam and that of the nonporous layer.

In order to produce a laminate structure having a soft and flexible feel and texture, appropriate stretch repulsion and stretchiness, the apparent specific gravity of the fibrous substrate is preferably in the range of 0.25 to 0.5 g/cm$^3$, and more preferably in the range of 0.3 to 0.35 g/cm$^3$. A fibrous substrate having an excessively high apparent specific gravity may often give a laminate structure with a rubber-like feel and texture. In contrast, a fibrous substrate having an excessively low apparent specific gravity may give a laminate structure with a texture of low stretch repulsion and low stretchiness. Thus, in both cases, it becomes difficult to obtain a laminate structure with a feel and a texture close to those of a natural leather.

The thickness of the foam arranged on the fibrous substrate can be set depending on, for example, the use of the resulting laminate structure and falls preferably between about 50 and 800 µm, and more preferably between about 50 and 600 µm. The expansion ratio of the foam, that is defined as the ratio of the specific gravity of the thermoplastic polymer composition before foaming based on the apparent specific gravity of the foam, is preferably in the range of from about 1.5 to 4 times. A foam having an expansion ratio within the above-described range shows appropriate flexibility and elasticity, and gives a laminate structure which is resistant against wrinkles and rough patterns on its surface when the laminate structure is pulled or bent, and which has leather-like feel and texture with high quality appearance. In addition, the resulting laminate structure has an improved bonding strength between the fibrous substrate and the foam, which results in the prevention of delamination.

The thermoplastic elastomer constituting the nonporous layer arranged on the foam is not specifically limited, as long as it is a thermoplastic elastomer having excellent properties such as flexibility, elasticity, abrasion resistance, mechanical strength, weatherability and hydrolysis resistance and showing affinity for the foam. Examples of the thermoplastic elastomer include thermoplastic polyurethanes; polyester elastomers comprising a hard segment of a crystalline aromatic polyester such as a poly(ethylene terephthalate), a poly(propylene terephthalate) or a poly(butylene terephthalate), and a soft segment of a polymer having a low glass transition temperature such as an aliphatic polyether, an aliphatic polyester, an aliphatic polycarbonate or an aliphatic polyester polycarbonate; polyamide elastomers comprising a hard segment of a polyamide such as 6-nylon, 6,6-nylon or 12-nylon, and a soft segment of an aliphatic polyether, an aliphatic polyester or an aliphatic polyester ether; styrene-based elastomers comprising a hard segment of a styrene polymer and a soft segment of, for example, a polyisoprene, a polybutadiene, a hydrogenated polyisoprene or a hydrogenated polybutadiene; silicone-based elastomers; chlorinated polymer-based elastomers; polyolefin elastomers comprising a hard segment of a polypropylene and a soft segment of, for example, an ethylene propylene rubber or a partially crosslinked ethylene propylene rubber; fluorocarbon polymer elastomers comprising a hard segment of a fluorocarbon resin and a soft segment of a fluororubber; 1,2-butadiene-based polymer elastomers; urethane-vinyl chloride elastomers; ethylene copolymers such as ethylene-vinyl acetate copolymers, ethylene-ethyl acrylate copolymers and ethylene-acrylic acid-sodium acrylate terpolymers; and the like. One or more of these elastomers can be employed to form the nonporous layer.

The preferred nonporous layer is the one made of a thermoplastic polyurethane or a mixture of a thermoplastic polyurethane and another thermoplastic elastomer. In this case, the resulting laminate structure has high adhesion strength between the foam and the nonporous layer, which results in the prevention of delamination, and shows excellent physical properties. To produce the nonporous layer from a thermoplastic polyurethane or a mixture of a thermoplastic polyurethane and another thermoplastic elastomer, various thermoplastic polyurethanes can be used as thermoplastic polyurethanes to form the nonporous layer. In general, a thermoplastic polyurethane having a hardness somewhat higher than that of the foam, constituting the laminate structure, is preferably used for formation of the above-described nonporous layer in order to obtain a laminate structure having more improved abrasion resistance.

The thickness of the nonporous layer can be set depending on, for example, the species of the thermoplastic elastomer constituting the nonporous layer and the use of the resulting laminate structure and falls preferably between about 10 and 200 µm, and more preferably between about 30 and 100 µm, since the resulting laminate structure has a leather-like feel and texture, good surface strength, adhesion strength with the foam and binding resistance. An excessively thin nonporous layer may often give a laminate structure in which the abrasion resistance of the surface thereof is reduced. In contrast, an excessively thick nonporous layer may give a laminate structure with rubber-like feel and texture, and reduced flexibility. Thus, in both cases, the resulting laminate structure tends to lose a leather-like feel and texture. The nonporous layer must be free from bubbles. If it contains bubbles, the laminate structure shows reduced abrasion resistance, strength and smoothness of the surface thereof, which may often cause color shade on its surface.

The uneven processing with embossed pattern and soon, and/or mirror-finished processing may be given to the surface of the nonporous layer. By processing an uneven pattern on the surface of the nonporous layer, the resulting laminate structure can have an embossing pattern on its surface which makes the laminate structure to be more close to a natural leather. In contrast, by mirror-finishing processing on the surface of the nonporous layer, the resulting laminate structure can have a glossy enamel-like surface. The laminate structure may have a surface of the nonporous layer which has been both processed by uneven processing and mirror-finished processing. In this case, the resulting laminate structure has an uneven pattern on its glossy enamel-like surface.

There is no specific restriction on the production process of the laminate structures. They can be produced by any process, as long as it can produce a laminate structure having a configuration of a fibrous substrate/a foam/a nonporous layer, smoothly without causing a delamination. The laminate structure is preferably produced, for example, by a method comprising the steps of (1) subjecting the thermoplastic polymer composition of the present invention to melt-extrusion foaming, with being extruded from a T-die as a foamed film, while kept at a molten state, followed by the lamination with the fibrous substrate before the foam loses its flowability to form a laminate comprising the fibrous substrate and the foam; and (2) subjecting a thermoplastic elastomer to melt-extrusion, with being extruded from a T-die as a film in a molten state, onto the surface of the foam of the laminate structure obtained above, followed by the lamination before the thermoplastic elastomer loses its flowability to give a laminate structure having the configuration of the fibrous substrate/the foam/a nonporous layer. This method can produce, smoothly and with good productivity, a laminate structure having high quality without delamination, in which the characteristics of the respective layers are effectively exhibited. In addition, such method does not require the use of a harmful substance such as an organic solvent and a chlorofluorocarbon.

The molding conditions, such as foaming temperature on the melt-extrusion foaming, in the step (1) of the production of the laminate structure may be the same as those illustrated in the production of the foam.

The thermoplastic elastomer can be laminated in the step (2), for example, by (i) a process in which the thermoplastic elastomer is melt-extruded, directly, on the foam of the laminate comprising the fibrous substrate and the foam, and allowing the resulting laminate structure to press bonding by making it pass through between a roll and an opposite back roll; (ii) a process in which the laminate comprising the fibrous substrate and the foam is fed between the roll and an opposite back roll, onto the roll of which the thermoplastic elastomer has been melt-extruded, and is subjected to transfer lamination by press bonding; (iii) a process in which the thermoplastic elastomer is melt-extruded, directly, into the gap between the surface of the foam of the laminate, comprising the fibrous substrate and the foam, and a roll which is placed to face the foam, and is subjected to lamination by press bonding with a back roll which is disposed to face the surface of the fibrous substrate of the laminate. The intended laminate structures can be smoothly produced by any of the processes (i), (ii) and (iii), as long as the thermoplastic elastomer has flowability when the lamination is carried out.

In addition, there is no specific restriction on the methods of uneven processing and/or mirror-finishing processing on the surface of the nonporous layer. Examples of such methods include (A) a method in which uneven processing and/or mirror-finishing processing on the surface of the nonporous layer are conducted, simultaneously, upon the lamination of the nonporous layer comprising the thermoplastic elastomer at a molten state with the foam by press bonding using a roll, on the surface of which uneven processing and/or mirror-finishing processing have been made, to be placed so as to face the foam of the laminate comprising the fibrous substrate and the foam, in any of the processes (i), (ii) and (iii); (B) a method in which uneven processing and/or mirror-finishing processing on the surface of the nonporous layer are conducted while the non porous layer, which is made of the thermoplastic elastomer and has been arranged on the foam, is still in a molten state, wherein the nonporous layer is susceptible to uneven pattern processing and/or mirror-finishing processing, using a roll for uneven processing and/or mirror-finishing processing, described in the process (A); and the like. Among them, the method (A) is preferred, since it requires fewer steps and can achieve high productivity. In the method (A), the pressure between the roll and the back roll is preferably set between 2 and 15 kg/cm² in terms of gauge pressure, since uneven processing and/or mirror-finishing processing on the surface of the nonporous layer can be conducted smoothly.

In carring out uneven processing and/or mirror-finishing processing on the surface of the nonporous layer, for example, a method which a roll with the surface of which uneven processing and/or mirror-finishing processing have been made is put into contact, directly, with the surface of the nonporous layer to form an uneven pattern and/or a mirror pattern on the surface of the nonporous layer; or a method in which a release process sheet with the surface of which uneven processing and/or mirror-finishing processing have been made is brought into contact with the surface of the nonporous layer, followed by pressing from behind the process sheet using, for example, a roll, to form an uneven pattern and/or a mirror pattern on the surface of the nonporous layer, can be adopted. The latter method using a release process sheet is convenient, since various uneven patterns and/or various mirror patterns can be formed on the surface of the nonporous layer by changing the process sheet.

In each method described above, the surface process roll or release process sheet for forming an uneven pattern and/or a mirror pattern on the surface of the nonporous layer is preferably removed from the nonporous layer after the nonporous layer loses its flowability. If the surface process roll or release process sheet is removed from the nonporous layer before the nonporous layer loses its flowability, the uneven pattern and/or the mirror pattern formed on the surface of the nonporous layer may be deformed or disappeared due to its flowability, which may result in the failure of forming a sharp uneven pattern and/or a glossy mirror pattern. In order to remove, smoothly and rapidly, the surface process roll or release process sheet from the surface of the nonporous layer, it is preferred to make rapid cooling of the nonporous layer, which uneven processing and/or mirror-finished processing are conducted, by a method in which a roll with an inner circulating coolant is used as the surface process roll and/or the press roll placed behind release process sheet, or by a method in which a cooling air is supplied to the position where uneven processing and/or mirror-finishing processing are conducted so as to make the position where the surface process roll or release process sheet is peeled off from the nonporous layer is positively cooled.

The roll brought into direct contact with the nonporous layer, which is used for forming the nonporous layer on the foam and/or used for conducting uneven processing and/or mirror-finishing processing on its surface of the nonporous layer, is preferably a metal roll. In contrast, as the back roll, which is not in direct contact with the nonporous layer, and as the roll disposed behind the releasable surface process sheet, various rolls such as a metal roll and an elastic roll can be used. Among them, an elastic roll is preferred, since the pressing can be carried out stably.

The laminate structure thus obtained can be effectively used, as an alternative material to a natural leather, for clothing such as coats, blazer coats and skirts; footwear such as shoes and boots; bags and pouches such as bags, camera cases and wallets; garments such as belts; sports goods such as basketballs and volleyballs; and the like.

EXAMPLES

The present invention will be explained more specifically with reference to examples but the present invention is not restricted at all to such examples.

In the following Examples and Comparative Examples, various properties are measured and estimated according to the following methods.

(1) Melt Viscosity

The block copolymer (II) or the thermoplastic polymer composition was dried at 80° C. under the reduced pressure of 10 Torr or less for 1 hour, and, after pre-heated at 200° C. for 5 minutes, tested for its melt viscosity using a Koka type flow tester [capillary rheometer, "CFT-500D", made by Shimadzu Corporation; nozzle shape: 1 mm in diameter and 10 mm in length] at 200° C. under the load of 490.3N [50 kgf]. Melt viscosities at various pre-heating times were measured at the same conditions, and plotted with respect to the pre-heating times. The melt viscosity at the time when the melt viscosity did not change according to the pre-heating time was designated as melt viscosity of the block copolymer (II) or the thermoplastic polymer composition.

(2) Hardness

The block copolymer (II) or the thermoplastic polymer composition was formulated into two circular plates [test pieces] having a diameter of 120 mm and a thickness of 2 mm by injection molding under the conditions of cylinder temperature of 180 to 210° C. and the mold temperature of 30° C. Then, the two circular plates were stacked one on another, and tested for the Shore A hardness thereof in accordance with the method of JIS K-7311.

(3) Melt-moldability

The thermoplastic polymer composition was extruded from a T-die film single-screw extruder (25 mm φ, die width: 350 mm) onto a cooling roll at 30° C. and rolled up at a roll draw rate of about 2.5 m/minute to give a sheet.

The melt-moldability was evaluated in accordance with the evaluation standards shown below.

◯: A sheet having a smooth surface was obtained at the roll draw rate of about 2.5 m/min.

Δ: The resulting sheet was not broken but had some uneven pattern or roughness.

X: The resulting sheet was broken and had some uneven pattern and roughness.

(4) Blocking Resistance

A sheet (inclusive of a foam) prepared from the thermoplastic polymer composition was rolled up, and allowed to stand still at room temperature for 24 hours. When the sheet was unwound from the roll by hand, the blocking resistance was evaluated, based on the resistance in unwinding, in accordance with the evaluation standards shown below.

◎: The sheet could be unwound very easily without a tensile force.

○: The sheet could be unwound smoothly.

Δ: The sheet could be unwound but required a significant tensile force.

X: The sheet was highly adhered and, therefore, could not be unwound.

(5) Apparent Specific Gravity of the Foam

The apparent specific gravity of the foam [sheet] was determined in accordance with the method of JIS K-6767.

(6) Appearance of the Foam

The appearance of the surface of the foam [sheet] was observed visually and evaluated in accordance with the evaluation standards shown below.

○: The foam had a smooth surface covered with a thin skin layer without uneven pattern or roughness caused by break of bubbles or variation in diameters of bubbles.

X: The foam had some uneven pattern or roughness on its surface caused by break of bubbles or variation in diameters of bubbles.

Abbreviations of the polymers and the compounds referred to in the following Examples and Comparative Examples are as follows.

[Functionality Block Copolymers]

F-HVSIS: Hydrogenated tri-block copolymer having a hydroxyl group on one terminal of the molecule comprising polystyrene block-polyisoprene block-polystyrene block [number average molecular weight: 63,000, styrene content: 30% by weight, hydrogenation ratio in the polyisoprene block: 90%, average number of hydroxyl group per molecule: 0.8, 1,4-bond content in the polyisoprene block: 45 mol %, 1,2- and 3,4-bond content in the polyisoprene block: 55 mol %], which was prepared by using styrene and isoprene as raw materials according to the method described in the Referential Example 3 of the Japanese Patent Application Laid-open No. Hei 10-139963.

F-HVSIS consists "HVSIS-OH" which is a hydrogenated tri-block copolymer having a hydroxyl group on one terminal of the molecule comprising polystyrene block-polyisoprene block-polystyrene block [number average molecular weight: 63,000, styrene content: 30% by weight, hydrogenation ratio in the polyisoprene block: 90%, 1,4-bond content in the polyisoprene block: 45 mol %, 1,2- and 3,4-bond content in the polyisoprene block: 55 mol %] and "HVSIS" which is a hydrogenated tri-block copolymer having no hydroxyl group on the molecule comprising polystyrene block-polyisoprene block-polystyrene block [number average molecular weight: 63,000, styrene content: 30% by weight, hydrogenation ratio in the polyisoprene block: 90%, 1,4-bond content in the polyisoprene block: 45 mol %, 1,2- and 3,4-bond content in the polyisoprene block: 55 mol %] at a molar ratio of HVSIS-OH/HVSIS=8/2.

F-SEEPS: Hydrogenated tri-block copolymer having a hydroxyl group on one terminal of the molecule comprising polystyrene block-copolymer block of isoprene and butadiene-polystyrene block [number average molecular weight: 50,000, styrene content: 30% by weight, hydrogenation ratio in the copolymer block of isoprene and butadiene: 98%, molar ratio of isoprene and butadiene: 50/50, average number of hydroxyl group per molecule: 0.9, 1,2- and 3,4-bond content in the copolymer block of isoprene and butadiene: 8 mol %,], which was prepared by using styrene, isoprene and butadiene as raw materials according to the method described in the Referential Example 1 of the Japanese Patent Application Laid-open No. Hei 10-139963.

F-SEEPS consists "SEEPS-OH" which is a hydrogenated tri-block copolymer having a hydroxyl group on one terminal of the molecule comprising polystyrene block-copolymer block of isoprene and butadiene-polystyrene block [number average molecular weight: 50,000, styrene content: 30% by weight, hydrogenation ratio in the copolymer block of isoprene and butadiene: 98%, molar ratio of isoprene and butadiene: 50/50, 1,2- and 3,4-bond content in the copolymer block of isoprene and butadiene: 8 mol %] and "SEEPS" which is a hydrogenated tri-block copolymer having no hydroxyl group on the molecule comprising polystyrene block-copolymer block of isoprene and butadiene-polystyrene block [number average molecular weight: 50,000, styrene content: 30% by weight, hydrogenation ratio in the copolymer block of isoprene and butadiene: 98%, molar ratio of isoprene and butadiene: 50/50, 1,2-and 3,4-bond content in the copolymer block of isoprene and butadiene: 8 mol %] at a molar ratio of SEEPS-OH/SEEPS=9/1.

[High Polymer Polyols]

POH-1: Polyester diol having a number average molecular weight of 1,500 and 2.00 hydroxyl groups in average per 1 molecule, prepared by the reaction of 3-methyl-1,5-pentane diol and adipic acid ["Kuraray Polyol P-1500", trade name, made by KURARAY Co., Ltd.]

POH-2: Polyester diol having a number average molecular weight of 3,500 and 2.00 hydroxyl groups in average per 1 molecule, prepared by the reaction of 3-methyl-1,5-pentanediol and adipic acid ["Kuraray Polyol P-3500", trade name, made by KURARAY Co., Ltd.]

POH-3: Poly(tetramethylene glycol) having a number average molecular weight of 1,000 and 2.00 hydroxyl groups in average per 1 molecule ["PTMG-1000", trade name, made by Mitsubishi Chemical Corp.]

POH-4: Poly(tetramethylene glycol) having a number average molecular weight of 2,000 and 2.00 hydroxyl groups in average per 1 molecule ["PTMG-2000", trade name, made by Mitsubishi Chemical Corp.]

POH-5: A polyester polyol having a number average molecular weight of 2000 and 3.00 hydroxyl groups in average per 1 molecule, which was obtained by the reaction of adipic acid, 3-methyl-1,5-pentanediol and trimethylolpropane.

[Chain Extenders]
BD: 1,4-butanediol
MPD: 3-methyl-1,5-pentanediol

[Organic Diisocyanate]
MDI: 4,4'-diphenylmethane diisocyanate

[Catalyst for Polyurethane Forming Reaction]
CAT: Dibutyltin diacetate

[Deactivator of the Catalyst for Polyurethane Forming Reaction]
INACT: Distearyl phosphate

[Alkyl Ester of (Meth)acrylic Acid Copolymer]
PM: A copolymer of 75% by weight of methyl methacrylate and 25% by weight of butyl acrylate, having a number average molecular weight of 300,000 ["Metablen P530A", trade name, made by Mitsubishi Rayon Co., Ltd.].

PM-C: A copolymer of 95% by weight of methyl methacrylate and 5% by weight of methyl acrylate, having a number average molecular weight of 78,000.

[Thermoplastic Polyurethane]
TPU: A polyester-based polyurethane ["Kuramiron U8165", trade name, made by KURARAY Co., Ltd.].

[Aromatic Vinyl Compound Block Copolymers]
SEBS: A hydrogenated tri-block copolymer comprising polystyrene block-polybutadiene block-polystyrene block ["Septon 8006", trade name, made by KURARAY Co., Ltd.].
SIS: A tri-block copolymer comprising polystyrene block-polyisoprene block-polystyrene block ["SIS5000", trade name, made by JSR Corporation].

[Paraffin Oil]
PL: Paraffin type of process oil ["Diana Process Oil PW-380", trade name, made by IDEMITSU KOSAN CO., LTD.]

[Thermal Decomposition Type Foaming Agent]
FAP: An azodicarbonamide type foaming agent ["Polythlene EB-106", trade name, made by Eiwa Chemical Industries Co., Ltd.]

Referential Example 1

A high polymer polyol [POH-1] containing 15 ppm of a catalyst for polyurethane forming reaction [CAT], a chain extender [MPD] and an organic diisocyanate [MDI] were fed into the feed zone of a twin-screw extruder [30 mm φ, L/D=36; the heating zone is divided into the feed zone, the compression zone and the metering zone] with coaxial screws, wherein their molar ratio of POH-1:MPD:MDI was 1.0:3.5:4.5 [nitrogen atom content: 4.3% by weight] and their total feed rate was 90 g/minute, and continuously melt-polymerized at 260° C. to effect a polyurethane formation. A functionality block copolymer [F-HVSIS] was continuously fed into the compression zone of the twin-screw extruder at a feed rate of 110 g/minute to effect the reaction with the resulting product of the above-described polyurethane formation. The resulting melt was continuously extruded into water as a strand, and the resulting strands were cut in pellets with a pelletizing machine. The resulting pellets were dried at 80° C. for 4 hours to give the block copolymer composition A [PU-HVSIS Compound A]. The melt viscosity of the block copolymer composition A [PU-HVSIS Compound A] was 11,500 poises.

A part of the block copolymer composition A was sampled and the polyurethane contained therein was extracted therefrom with dimethylformamide. Next, the HVSIS and the unreacted HVSIS-OH were extracted from the sample with cyclohaxane. The remaining solid was dried to give a block copolymer A. $^1$H-NMR analysis showed that the block copolymer A was a di-block copolymer having one polymer block (1) comprising polystyrene block-hydrogenated polyisoprene block-polystyrene block and one polymer block (2) comprising a polyurethane of poly(3-methyl-1,5-pentanediol adipate) unit, 4,4'-diphenylmethane diisocyanate unit and 3-methyl-1,5-pentanediol unit. In addition, GPC analysis showed that the extract by cyclohexane contained a tri-block copolymer having two polymer blocks (1) comprising polystyrene block-hydrogenated polyisoprene block-polystyrene block and one polymer block (2) comprising a polyurethane of poly(3-methyl-1,5-pentanediol adipate) unit, 4,4'-diphenylmethane diisocyanate unit and 3-methyl-1,5-pentanediol unit.

The amounts of the polyurethane, which was extracted with dimethylformamide, the unreacted HVSIS-OH, the HVSIS and the tri-block copolymer, which were extracted with cyclohexane, were 163 parts by weight of the polyurethane, 0 part by weight of the HVSIS-OH, 48 parts by weight of the HVSIS and 124 parts by weight of the tri-block copolymer, respectively, based on 100 parts by weight of the di-block copolymer.

Each of the polymer blocks (1) of the di-block copolymer and the tri-block copolymer had the same profiles as those of the HVSIS.

Referential Example 2

A high polymer polyol [POH-3] containing 5 ppm of a catalyst for polyurethane forming reaction [CAT], a chain extender [MPD] and an organic diisocyanate [MDI] were fed into the feed zone of a twin-screw extruder [30 mm φ, L/D=36; the heating zone is divided into the feed zone, the compression zone and the metering zone] with coaxial screws, wherein their molar ratio of POH-3:MPD:MDI was 1.0:2.4:3.4 [nitrogen atom content: 4.6% by weight] and their total feed rate was 90 g/minute, and continuously melt-polymerized at 260° C. to effect a polyurethane formation. A functionality block copolymer [F-HVSIS] was continuously fed into the compression zone of the twin-screw extruder at a feed rate of 110 g/minute to effect the reaction with the resulting product of the above-described polyurethane formation. The resulting melt was continuously extruded into water as a strand, and the resulting strands were cut in pellets with a pelletizing machine. The resulting pellets were dried at 80° C. for 4 hours to give the block copolymer composition B [PU-HVSIS Compound B]. The melt viscosity of the block copolymer composition B [PU-HVSIS Compound B] was 16,200 poises.

A part of the block copolymer composition B was sampled and the polyurethane contained therein was extracted therefrom with dimethylformamide. Next, the HVSIS and the unreacted HVSIS-OH were extracted from the sample with cyclohaxane. The remaining solid was dried to give a block copolymer B. $^1$H-NMR analysis showed that the block copolymer B was a di-block copolymer having one polymer block (1) comprising polystyrene block-hydrogenated polyisoprene block-polystyrene block and one polymer block (2) comprising a polyurethane of poly(tetramethylene glycol) unit, 4,4'-diphenylmethane diisocyanate unit and 3-methyl-1,5-pentanediol unit. In addition, GPC analysis showed that the extract by cyclohexane contained a tri-block copolymer having two polymer blocks (1) comprising polystyrene block-hydrogenated polyisoprene block-polystyrene block and one polymer block (2) comprising a polyurethane of poly(tetramethylene glycol) unit, 4,4'-diphenylmethane diisocyanate unit and 3-methyl-1,5-pentanediol unit.

The amounts of the polyurethane, which was extracted with dimethylformamide, the unreacted HVSIS-OH, the HVSIS and the tri-block copolymer, which were extracted with cyclohexane, were 200 parts by weight of the polyurethane, 0 part by weight of the HVSIS-OH, 55 parts by weight of the HVSIS and 145 parts by weight of the tri-block copolymer, respectively, based on 100 parts by weight of the di-block copolymer.

Each of the polymer blocks (1) of the di-block copolymer and the tri-block copolymer had the same profiles as those of the HVSIS.

Referential Example 3

A high polymer polyol [POH-2] containing 15 ppm of a catalyst for polyurethane forming reaction [CAT], a chain extender [BD] and an organic diisocyanate [MDI] were fed into the feed zone of a twin-screw extruder [30 mm φ, L/D=36; the heating zone is divided into the feed zone, the compression zone and the metering zone] with coaxial screws, wherein their molar ratio of POH-2:BD:MDI was 1.0:2.0:3.0 [nitrogen atom content: 1.9% by weight] and their total feed rate was 100 g/minute, and continuously melt-polymerized at 260° C. to effect a polyurethane formation. A functionality block copolymer [F-HVSIS] was continuously fed into the compression zone of the twin-screw extruder at a feed rate of 100 g/minute to effect the reaction with the resulting product of the above-described polyurethane formation. The resulting melt was continuously extruded into water as a strand, and the resulting strands were cut in pellets with a pelletizing machine. The resulting pellets were dried at 80° C. for 4 hours to give the block copolymer composition C [PU-HVSIS Compound C]. The melt viscosity of the block copolymer composition C [PU-HVSIS Compound C] was 4,500 poises.

A part of the block copolymer composition C was sampled and the polyurethane contained therein was extracted therefrom with dimethylformamide. Next, the HVSIS and the unreacted HVSIS-OH were extracted from the sample with cyclohaxane. The remaining solid was dried to give a block copolymer C. $^1$H-NMR analysis showed that the block copolymer C was a di-block copolymer having one polymer block (1) comprising polystyrene block-hydrogenated polyisoprene block-polystyrene block and one polymer block (2) comprising a polyurethane of poly(3-methyl-1,5-pentanediol adipate) unit, 4,4'-diphenylmethane diisocyanate unit and 1,4-butanediol unit. In addition, GPC analysis showed that the extract by cyclohexane contained a tri-block copolymer having two polymer blocks (1) comprising polystyrene block-hydrogenated polyisoprene block-polystyrene block and one polymer block (2) comprising a polyurethane of poly(3-methyl-1,5-pentanediol adipate) unit, 4,4'-diphenylmethane diisocyanate unit and 1,4-butanediol unit.

The amounts of the polyurethane, which was extracted with dimethylformamide, the unreacted HVSIS-OH, the HVSIS and the tri-block copolymer, which were extracted with cyclohexane, were 182 parts by weight of the polyurethane, 0 part by weight of the HVSIS-OH, 45 parts by weight of the HVSIS and 127 parts by weight of the tri-block copolymer, respectively, based on 100 parts by weight of the di-block copolymer.

Each of the polymer blocks (1) of the di-block copolymer and the tri-block copolymer had the same profiles as those of the HVSIS. The number average molecular weight of the di-block copolymer was 155,000. Also, the number average molecular weight of the tri-block copolymer was 160,000.

Referential Example 4

A high polymer polyol [a mixture of 30 mol % of POH-2 and 70 mol % of POH-4] containing 10 ppm of a catalyst for polyurethane forming reaction [CAT], a chain extender [BD] and an organic diisocyanate [MDI] were fed into the feed zone of a twin-screw extruder [30 mm φ, L/D=36; the heating zone is divided into the feed zone, the compression zone and the metering zone] with coaxial screws, wherein their molar ratio of the high polymer polyol [POH-2 and POH-4]:BD:MDI was 1.00:1.09:2.08 [nitrogen atom content: 1.9% by weight] and their total feed rate was 137.5 g/minute, and continuously melt-polymerized at 260° C. to effect a polyurethane formation. A mixture of an aromatic vinyl compound block copolymer [SEBS] and a paraffin oil [PL] in a weight ratio of 1/1, and a functionality block copolymer [F-SEEPS] were continuously fed into the compression zone of the twin-screw extruder through another twin-screw extruder [30 mm φ, L/D=36; heated to 220° C.], connected to said compression zone, wherein the feed rate of the mixture [SEBS and PL] was 90.9 g/minute and the feed rate of the functionality block copolymer [F-SEEPS] was 22.5 g/minute, to effect the reaction with the resulting product of the above-described polyurethane formation. The resulting melt was continuously extruded into water as a strand, and the resulting strands were cut in pellets with a pelletizing machine. The resulting pellets were dried at 70° C. for 4 hours to give the block copolymer composition D [PU-SEEPS Compound D]. The melt viscosity of the block copolymer composition D [PU-SEEPS Compound D] was 13,900 poises.

A part of the block copolymer composition D was sampled and the polyurethane contained therein was extracted therefrom with dimethylformamide. Next, the PL, the SEBS, the SEEPS and the unreacted SEEPS-OH were extracted from the sample with cyclohaxane. The remaining solid was dried to give a block copolymer D. $^1$H-NMR analysis showed that the block copolymer D was a di-block copolymer having one polymer block (1) comprising polystyrene block-hydrogenated copolymer block of isoprene and butadiene-polystyrene block and one polymer block (2) comprising a polyurethane of poly(3-methyl-1,5-pentanediol adipate) unit, poly(tetramethylene glycol) unit, 4,4'-diphenylmethane diisocyanate unit and 1,4-butanediol unit. In addition, GPC analysis showed that the extract by cyclohexane contained a tri-block copolymer having two polymer blocks (1) comprising polystyrene block-hydrogenated copolymer block of isoprene and butadiene-polystyrene block and one polymer block (2) comprising a polyurethane of poly(3-methyl-1,5-pentanediol adipate) unit, poly(tetramethylene glycol) unit, 4,4'-diphenylmethane diisocyanate unit and 1,4-butanediol unit.

The amounts of the polyurethane, which was extracted with dimethylformamide, the unreacted SEEPS-OH, the SEEPS, the SEBS, the PL and the tri-block copolymer, which were extracted with cyclohexane, were 2140 parts by weight of the polyurethane, 0 part by weight of the SEEPS-OH, 36 parts by weight of the SEEPS, 720 parts by weight of the SEBS, 720 parts by weight of the PL and 284 parts by weight of the tri-block copolymer, respectively, based on 100 parts by weight of the di-block copolymer.

Each of the polymer blocks (1) of the di-block copolymer and the tri-block copolymer had the same profiles as those of the SEEPS.

Referential Example 5

A high polymer polyol [POH-2] containing 15 ppm of dibutyltin diacetate [catalyst for polyurethane forming reaction], a chain extender [BD] and an organic diisocyanate [MDI] were fed into the feed zone of a twin-screw extruder [30 mm φ, L/D=36; the heating zone is divided into the feed zone, the compression zone and the metering zone] with coaxial screws, wherein their molar ratio of POH-2:BD:MDI was 1.0:2.0:3.0 [nitrogen atom content: 1.9% by weight] and their total feed rate was 100 g/minute, and continuously melt-polymerized at 260° C. to effect a polyurethane formation. A functionality block copolymer [F-SEEPS] was continuously fed into the compression zone of the twin-screw extruder at a feed rate of 100 g/minute to effect the reaction with the resulting product of the above-described polyurethane formation. The resulting melt was continuously extruded into water as a strand, and the resulting strands were cut in pellets with a pelletizing machine. The resulting pellets were dried at 80° C. for 4 hours to give the block copolymer composition E [PU-SEEPS Compound E]. The melt viscosity of the block copolymer composition E [PU-SEEPS Compound E] was 37,000 poises.

A part of the block copolymer composition E [PU-SEEPS Compound E] was sampled and the polyurethane contained therein was extracted therefrom with dimethylformamide. Next, the SEEPS and the unreacted SEEPS-OH were extracted from the sample with cyclohaxane. The remaining solid was dried to give a block copolymer E. $^1$H-NMR analysis showed that the block copolymer E was a di-block copolymer having one polymer block (1) comprising polystyrene block-hydrogenated copolymer block of isoprene and butadiene-polystyrene block and one polymer block (2) comprising a polyurethane of poly(3-methyl-1,5-pentanediol adipate) unit, 4,4'-diphenylmethane diisocyanate unit and 1,4-butanediol unit. In addition, GPC analysis showed that the extract by cyclohexane contained a tri-block copolymer having two polymer blocks (1) comprising polystyrene block-hydrogenated copolymer block of isoprene and butadiene-polystyrene block and one polymer block (2) comprising a polyurethane of poly(3-methyl-1,5-pentanediol adipate) unit, 4,4'-diphenylmethane diisocyanate unit and 1,4-butanediol unit.

The amounts of the polyurethane, which was extracted with dimethylformamide, the unreacted SEEPS-OH, the SEEPS and the tri-block copolymer, which were extracted with cyclohexane, were 183 parts by weight of the polyurethane, 0 part by weight of the SEEPS-OH, 22 parts by weight of the SEEPS and 130 parts by weight of the tri-block copolymer, respectively, based on 100 parts by weight of the di-block copolymer.

Each of the polymer blocks (1) of the di-block copolymer and the tri-block copolymer had the same profiles as those of the SEEPS.

The number average molecular weight of the di-block copolymer was 85,000. Also, the number average molecular weight of the tri-block copolymer was 102,000.

Referential Example 6

A high polymer polyol having 2.01 hydroxyl groups in average per 1 molecule [a mixture of 99.0 mol % of POH-2 and 1.0 mol % of POH-5] containing 10 ppm of a catalyst for polyurethane forming reaction [CAT], a chain extender [BD] and an organic diisocyanate [MDI] were fed into the feed zone of a twin-screw extruder [30 mm φ, L/D=36; the heating zone is divided into the feed zone, the compression zone and the metering zone] with coaxial screws, wherein their molar ratio of the high polymer polyol [POH-2 and POH-5]:BD:MDI was 1.00:2.4:3.4 [nitrogen atom content: 2.1% by weight] and their total feed rate was 100 g/minute, and continuously melt-polymerized at 260° C. to effect a polyurethane formation. A mixture of an aromatic vinyl compound block copolymer [SEBS] and a paraffin oil [PL] in a weight ratio of 1/1, and the block copolymer composition E [PU-SEEPS Compound E] were continuously fed into the compression zone of the twin-screw extruder through another twin-screw extruder [30 mm φ, L/D=36; heated to 220° C.], connected to said compression zone, wherein the feed rate of the mixture [SEBS and PL] was 100 g/minute and the feed rate of the block copolymer composition E was 50 g/minute, to effect the reaction with the resulting product of the above-described polyurethane formation. Then, a deactivator of the catalyst for polyurethane forming reaction [INACT] was fed into the metering zone of the twin-screw extruder at a feed rate of 0.075 g/minute [0.03% by weight based on the resulting mixture] to give a melt of the thermoplastic polymer composition. The resulting melt was continuously extruded into water as a strand, and the resulting strands were cut in pellets with a pelletizing machine. The resulting pellets were dried at 70° C. for 4 hours to give the block copolymer composition F [PU-SEEPS Compound F]. The melt viscosity of the block copolymer composition F [PU-SEEPS Compound F] was 16,900 poises.

Example 1

A mixture of 100 parts by weight of the block copolymer composition A [PU-HVSIS Compound A] and 2 parts by weight of PM was melt-kneaded with a single-screw extruder [25 mm φ, cylinder temperature: 190 to 225° C., die temperature: 230° C., rotation speed of gear pump: 16.7 rpm] to give a thermoplastic polymer composition, which was extruded on a cooling roll set at 30° C. through a T-die of the single-screw extruder, and rolled up at a roll draw rate of about 2.5 m/minute, to give a sheet having a thickness of 200 μm.

The melt-moldability and the blocking resistance are shown in the Table 1. In addition, the obtained thermoplastic polymer composition was measured and evaluated the melt-viscosity and the hardness. Results are shown in the Table 1.

Example 2

A mixture of 100 parts by weight of the block copolymer composition B [PU-HVSIS Compound B] and 4 parts by weight of PM was melt-kneaded with a single-screw extruder [25 mm φ, cylinder temperature: 190 to 225° C., die temperature: 230° C., rotation speed of gear pump: 16.7 rpm] to give a thermoplastic polymer composition, which was extruded on a cooling roll set at 30° C. through a T-die of the single-screw extruder, and rolled up at a roll draw rate of about 2.5 m/minute, to give a sheet having a thickness of 200 μm.

The melt-moldability and the blocking resistance are shown in the Table 1. In addition, the obtained thermoplastic polymer composition was measured and evaluated the melt-viscosity and the hardness. Results are shown in the Table 1.

Example 3

A mixture of 100 parts by weight of the block copolymer composition D [PU-SEEPS Compound D] and 3 parts by weight of PM was melt-kneaded with a single-screw extruder [25 mm φ, cylinder temperature: 190 to 225° C., die temperature: 225° C., rotation speed of gear pump: 15.0 rpm] to give a thermoplastic polymer composition, which was extruded on a cooling roll set at 30° C. through a T-die of the single-screw extruder, and rolled up at a roll draw rate of about 2.5 m/minute, to give a sheet having a thickness of 125 μm.

The melt-moldability and the blocking resistance are shown in the Table 1. In addition, the obtained thermoplastic polymer composition was measured and evaluated the melt-viscosity and the hardness. Results are shown in the Table 1.

Comparative Example 1

A mixture of 100 parts by weight of the block copolymer composition A [PU-HVSIS Compound A] and 5 parts by weight of PM-C was melt-kneaded with a single-screw extruder [25 mm φ, cylinder temperature: 190 to 225° C., die temperature: 225° C., rotation speed of gear pump: 15.0 rpm] to give a thermoplastic polymer composition, which was extruded on a cooling roll set at 30° C. through a T-die of the single-screw extruder, and rolled up at a roll draw rate of about 2.5 m/minute, to give a sheet having a thickness of 200 μm.

The melt-moldability and the blocking resistance are shown in the Table 1. In addition, the obtained thermoplastic polymer composition was measured and evaluated the melt-viscosity and the hardness. Results are shown in the Table 1.

Comparative Example 2

The block copolymer composition A [PU-HVSIS Compound A] was fed into a single-screw extruder [25 mm φ, cylinder temperature: 190 to 225° C., die temperature: 230° C., rotation speed of gear pump: 16.7 rpm], extruded on a cooling roll set at 30° C. through a T-die of the single-screw extruder, and rolled up at a roll draw rate of about 2.5 m/minute, to give a sheet.

The blocking resistance was not evaluated, because the sheet had remarkable breaks. On the other hand, the melt-moldability and the hardness of the block copolymer composition A are shown in the Table 1.

TABLE 1

|  | Examples | | | Comparative Examples | |
|---|---|---|---|---|---|
|  | 1 | 2 | 3 | 1 | 2 |
| Composition [Part by weight] | | | | | |
| PU-HVSIS Compound A | 100 | | | 100 | 100 |
| PU-HVSIS Compound B | | 100 | | | |
| PU-SEEPS Compound D | | | 100 | | |
| PM | 2 | 4 | 3 | | |
| PM-C | | | | 5 | |
| Melt viscosity | 11,850 | 16,300 | 8,300 | 11,200 | 11,500 |
| Melt-moldability | ○ | ○ | ○ | Δ | X |
| Properties of the molded article | | | | | |
| Hardness [shore A] | 70 | 68 | 50 | 70 | 70 |
| Blocking resistance | ○ | ○ | ○ | Δ | — |

Example 4

A mixture of 100 parts by weight of the block copolymer composition A [PU-HVSIS Compound A], 10 parts by weight of the PM and 10 parts by weight of the FAP was melt-kneaded with a single-screw extruder [25 mm φ, cylinder temperature: 170 to 220° C., die temperature: 176 to 184° C., rotation speed of gear pump: 15.0 rpm], and the resulting melt was melt-extruded as a film with foaming, while being extruded through a T-die having a gap of 0.7 mm and a width of 350 mm, to give a foamed sheet.

The apparent specific gravity, the appearance and the blocking resistance of the resulting foam [sheet] were measured and evaluated according to the above-described methods. Results are shown in the Table 2.

Example 5

A mixture of 100 parts by weight of the block copolymer composition C [PU-HVSIS Compound C], 10 parts by weight of the PM and 10 parts by weight of the FAP was melt-kneaded with a single-screw extruder [25 mm φ, cylinder temperature: 170 to 220° C., die temperature: 176 to 184° C., rotation speed of gear pump: 15.0 rpm], and the resulting melt was melt-extruded as a film with foaming, while being extruded through a T-die having a gap of 0.7 mm and a width of 350 mm, to give a foamed sheet.

The apparent specific gravity, the appearance and the blocking resistance of the resulting foam [sheet] were measured and evaluated according to the above-described methods. Results are shown in the Table 2.

Example 6

A mixture of 100 parts by weight of the block copolymer composition D [PU-SEEPS Compound D], 10 parts by weight of the PM and 10 parts by weight of the FAP was melt-kneaded with a single-screw extruder [25 mm φ, cylinder temperature: 170 to 220° C., die temperature: 176 to 184° C., rotation speed of gear pump: 15.0 rpm], and the resulting melt was melt-extruded as a film with foaming, while being extruded through a T-die having a gap of 0.7 mm and a width of 350 mm, to give a foamed sheet.

The apparent specific gravity, the appearance and the blocking resistance of the resulting foam [sheet] were measured and evaluated according to the above-described methods. Results are shown in the Table 2.

Example 7

A mixture of 100 parts by weight of the block copolymer composition F [PU-SEEPS Compound F], 5 parts by weight of the PM and 10 parts by weight of the FAP was melt-kneaded with a single-screw extruder [25 mm φ, cylinder temperature: 170 to 220° C., die temperature: 176 to 184° C., rotation speed of gear pump: 15.0 rpm], and the resulting melt was melt-extruded as a film with foaming, while being extruded through a T-die having a gap of 0.7 mm and a width of 350 mm, to give a foamed sheet.

The apparent specific gravity, the appearance and the blocking resistance of the resulting foam [sheet] were measured and evaluated according to the above-described methods. Results are shown in the Table 2.

Comparative Example 3

A mixture of 100 parts by weight of the block copolymer composition C [PU-HVSIS Compound C] and 10 parts by weight of the FAP was melt-kneaded with a single-screw extruder [25 mm φ, cylinder temperature: 170 to 220° C., die temperature: 176 to 184° C., rotation speed of gear pump: 15.0 rpm], and the resulting melt was melt-extruded as a film with foaming, while being extruded through a T-die having a gap of 0.7 mm and a width of 350 mm, to give a foamed sheet.

The apparent specific gravity, the appearance and the blocking resistance of the resulting foam [sheet] were measured and evaluated according to the above-described methods. Results are shown in the Table 2.

Comparative Example 4

A mixture of 100 parts by weight of the block copolymer composition D [PU-SEEPS Compound D], 10 parts by weight of the PM-C and 10 parts by weight of the FAP was melt-kneaded with a single-screw extruder [25 mm φ, cylinder temperature: 170 to 220° C., die temperature: 176 to 184° C., rotation speed of gear pump: 15.0 rpm], and the resulting melt was melt-extruded as a film with foaming, while being extruded through a T-die having a gap of 0.7 mm and a width of 350 mm, to give a foamed sheet.

The apparent specific gravity, the appearance and the blocking resistance of the resulting foam [sheet] were measured and evaluated according to the above-described methods. Results are shown in the Table 2.

Comparative Example 5

A mixture of 100 parts by weight of the block copolymer composition D [PU-SEEPS Compound D] and 10 parts by weight of the FAP was melt-kneaded with a single-screw extruder [25 mm φ, cylinder temperature: 170 to 220° C., die temperature: 176 to 184° C., rotation speed of gear pump: 15.0 rpm], and the resulting melt was melt-extruded as a film with foaming, while being extruded through a T-die having a gap of 0.7 mm and a width of 350 mm, to give a foamed sheet.

The apparent specific gravity, the appearance and the blocking resistance of the resulting foam [sheet] were measured and evaluated according to the above-described methods. Results are shown in the Table 2.

Comparative Example 6

A mixture of 100 parts by weight of the block copolymer composition D [PU-SEEPS Compound D], 50 parts by weight of the PM and 10 parts by weight of the FAP was melt-kneaded with a single-screw extruder [25 mm φ, cylinder temperature: 170 to 220° C., die temperature: 176 to 184° C., rotation speed of gear pump: 15.0 rpm], and the resulting melt was melt-extruded as a film with foaming, while being extruded through a T-die having a gap of 0.7 mm and a width of 350 mm, to give a foamed sheet.

The apparent specific gravity and the blocking resistance were not evaluated, because the resulting foamed sheet was not uniform in thickness and had remarkable roughness.

Comparative Example 7

A mixture of 10 parts by weight of the PM, 50 parts by weight of the TPU, 20 parts by weight of the SEBS, 20 parts by weight of the PL and 10 parts by weight of the FAP was melt-kneaded with a single-screw extruder [25 mm φ, cylinder temperature: 170 to 220° C., die temperature: 176 to 184° C., rotation speed of gear pump: 15.0 rpm], and the resulting melt was melt-extruded as a film with foaming, while being extruded through a T-die having a gap of 0.7 mm and a width of 350 mm, to give a foamed sheet.

The apparent specific gravity and the blocking resistance were not evaluated, because the resulting foamed sheet was not uniform in thickness and had remarkable roughness [the evaluation of the appearance: X].

Comparative Example 8

A mixture of 10 parts by weight of the PM, 50 parts by weight of the TPU, 20 parts by weight of the SIS and 10 parts by weight of the FAP was melt-kneaded with a single-screw extruder [25 mm φ, cylinder temperature: 170 to 220° C., die temperature: 176 to 184° C., rotation speed of gear pump: 15.0 rpm], and the resulting melt was melt-extruded as a film with foaming, while being extruded through a T-die having a gap of 0.7 mm and a width of 350 mm, to give a foamed sheet.

The appearance and the blocking resistance of the resulting foam [sheet] were measured and evaluated according to the above-described methods. Results are shown in the Table 2. However, the apparent specific gravity was not evaluated, because the resulting foamed sheet had remarkable roughness.

TABLE 2

|  | Examples | | | | Comparative Examples | | | | | |
| --- | --- | --- | --- | --- | --- | --- | --- | --- | --- | --- |
|  | 4 | 5 | 6 | 7 | 3 | 4 | 5 | 6 | 7 | 8 |
| Composition [Part by weight] | | | | | | | | | | |
| PU-HVSIS Compound A | 100 | | | | | | | | | |
| PU-HVSIS Compound C | | 100 | | | 100 | | | | | |
| PU-SEEPS Compound D | | | 100 | | | 100 | 100 | 100 | | |
| PU-SEEPS Compound F | | | | 100 | | | | | | |
| PM | 10 | 10 | 10 | 5 | | | | 50 | 10 | 10 |
| PM-C | | | | | | 10 | | | | |
| TPU | | | | | | | | | 50 | 50 |
| SEBS | | | | | | | | | 20 | |
| SIS | | | | | | | | | | 20 |
| FAP | 10 | 10 | 10 | 10 | 10 | 10 | 10 | 10 | 10 | 10 |
| Properties of the foam [sheet] | | | | | | | | | | |
| Blocking resistance | ⊚ | ⊚ | ⊚ | ⊚ | ○ | Δ | Δ | — | — | X |
| Apparent specific gravity | 0.50 | 0.48 | 0.50 | 0.52 | 0.58 | 0.75 | 0.78 | — | — | — |
| Appearance | ○ | ○ | ○ | ○ | X | X | X | X | X | X |

Example 8

(1) An ultrafine nylon fiber entangled nonwoven fabric [mass per unit area: 300 g/m$^2$] comprising ultrafine fiber bundles each containing about 300 plies of an ultrafine nylon fiber having a monofilament fineness of 0.007 denier was impregnated with a solution of a polyurethane elastomer [Kuramiron U9198; trade name, made by Kuraray Co., Ltd.; inherent viscosity: 1.05 dl/g, Shore A hardness: 98] in N,N-dimethylformamide, and dried to give a fibrous substrate. The fibrous substrate had a thickness of 1.3 mm, a mass per unit area of 442 g/m$^2$ and a weight ratio of the ultrafine nylon fiber entangled nonwoven fabric based on the polyurethane elastomer of 6/4.

(2) The fibrous substrate obtained in the above-described step (1) was continuously fed through between a mirror-finished metal roll and an elastic back roll. A mixture comprising 100 parts by weight of the block copolymer composition D (PU-SEEPS Compound D), 10 parts by weight of PM and 10 parts by weight of FAP was melt-kneaded with a single-screw extruder [25 mm in diameter, cylinder temperature: 170 to 220° C., die temperature: 176 to 184° C., rotation speed of gear pump: 15.0 rpm], and melt-extruded as a film from its T-die [gap: 0.2 mm, die width: 350 mm] at a die temperature of 180° C., to effect foaming. The film in a molten state was fed through between the metal roll and the fibrous substrate, and cold-pressed at a gauge pressure of 4 kg/cm$^2$ to give a laminate structure comprising the fibrous substrate and a foam layer having a thickness of 200 μm arranged on the fibrous substrate. The expansion ratio of the foam layer in the laminate structure was 1.8.

Example 9

The fibrous substrate prepared in the step (1) of Example 8 was continuously fed through between a mirror-finished metal roll and an elastic back roll. A mixture comprising 100 parts by weight of the block copolymer composition E (PU-SEEPS Compound E), 10 parts by weight of PM and 10 parts by weight of FAP was melt-kneaded with a single-screw extruder (25 mm in diameter, cylinder temperature: 170 to 220° C., die temperature: 176 to 184° C., rotation speed of gear pump: 15.0 rpm), and melt-extruded as a film from its T-die. (gap: 0.2 mm, die width: 350 mm) at a die temperature of 180° C., to effect foaming. The film in a molten state was fed through between the metal roll and the fibrous substrate, and cold-pressed at a gauge pressure of 8 kg/cm$^2$ to give a laminate structure comprising the fibrous substrate and a foam layer having a thickness of 330 μm arranged on the fibrous substrate. The expansion ratio of the foam layer in the laminate structure was 2.0.

Example 10

The laminate structure comprising the fibrous substrate and the foam layer prepared in Example 8 was fed through between a metal embossed roll having a pore-like uneven pattern and an elastic back roll. A thermoplastic polyurethane composition for the formation of a nonporous layer, which comprises 100 parts by weight of a thermo plastic polyurethane [Kuramiron U3190; trade name; made by Kuraray Co., Ltd.] and 5 parts by weight of black pigment pellets [polyethylene pellets containing 20% by weight of a pigment], was molten with a single-screw extruder (25 mm in diameter; cylinder temperature: 170 to 220° C.), and extruded as a film from its T-die (gap: 0.5 mm, die width: 350 mm) at a die temperature of 220° C. The film in a molten state was fed through between the metal embossed roll and the foam layer of the laminate structure, and cold-pressed at a gauge pressure of 4 kg/cm$^2$ to give a three-layered laminate structure comprising a nonporous layer having a thickness of 35 μm arranged on the foam layer. The resulting three-layered laminate structure had the configuration of the fibrous substrate layer/the foam layer/a nonporous layer. The three-layered laminate structure could be stably produced at a line speed of 3 m/minute.

The three-layered laminate structure was a leather-like laminate structure, showed satisfactory flexibility, very excellent appearance, feel, texture and touch, and caused no unevenness or wrinkles of low quality on the surface thereof when elongated or bent.

Example 11

The fibrous substrate prepared in the step (1) of Example 8 was continuously fed through between a mirror-finished metal roll and an elastic back roll. A mixture comprising 100 parts by weight of the block copolymer composition D (PU-SEEPS Compound D) and 10 parts by weight of PM was melt-kneaded with a single-screw extruder (25 mm in diameter, cylinder temperature: 170 to 220° C., die temperature: 220° C., rotation speed of gear pump: 15.0 rpm), and melt-extruded as a film from its T-die (gap: 0.2 mm, die width: 350 mm) at a die temperature of 180° C. The film in a molten state was fed through between the metal roll and the fibrous substrate, and cold-pressed at a gauge pressure of 4 kg/cm$^2$ to give a laminate structure comprising the fibrous substrate and a polyurethane layer (nonporous layer) having a thickness of 100 μm arranged on the fibrous substrate.

INDUSTRIAL APPLICABILITY

According to the present invention, it is provided a thermoplastic polymer composition comprising an alkyl ester of (meth)acrylic acid copolymer and a block copolymer prepared by extending, with a specific polyurethane component, the polymer chain of a block copolymer, which may be hydrogenated, having a polymer block of an aromatic vinyl compound and a polymer block of a conjugated diene. The thermoplastic polymer composition of the present invention has excellent properties such as non-tackiness, melt-moldability and melt-adhesiveness to other resins upon the lamination therewith. Also, the thermoplastic polymer composition of the present invention has melt characteristics suitable for the production of a foam. Therefore, the thermoplastic polymer composition of the present invention can be applied favorably for the production of various molded articles including a foam.

The invention claimed is:

1. A thermoplastic polymer composition, comprising:
   (i) an alkyl ester of (meth) acrylic acid copolymer (I), having a number average molecular weight of not less than 100,000; and
   (ii) a block copolymer (II) having a polymer block (1) of a block copolymer, which may be hydrogenated, of an aromatic vinyl compound polymer block (a-1) and a conjugated diene polymer block (b-1), and a polymer block (2) of a polyurethane,
   wherein the weight ratio of the alkyl ester of (meth) acrylic acid copolymer (I) based on the block copolymer (II), falls between 60/40 and 0.1/99.9.

2. The thermoplastic polymer composition according to claim 1, further comprising a thermoplastic polyurethane (III).

3. The thermoplastic polymer composition according to claim 1, further comprising a block copolymer (IV), which may be hydrogenated, having an aromatic vinyl compound polymer block (a-2) and a conjugated diene compound polymer block (b-2).

4. The thermoplastic polymer composition according to claim 1, futher comprising a paraffin oil (V).

5. The thermoplastic polymer composition according to claim 1, further comprising a thermal decomposition type foaming agent (VI).

6. A molded article, comprising the thermoplastic polymer composition of claim 1.

7. The molded article according to claim 6,which is a foam.

8. A composite article, comprising a member, comprising the thermoplastic polymer composition according to claim 1, and a member of another material.

9. A composite article, comprising a member, having a foam structure, of the thermoplastic polymer composition according to claim 1, and a member of another material.

10. A method for producing a foam, comprising the step of subjecting the thermoplastic polymer composition of claim 5 to melt-extruding and foaming.

11. A method for producing a composite article, comprising the step of compounding a foam of the thermoplastic polymer composition according to claim 1, with another material.

12. A method for producing a composite article, comprising the step of subjecting a composite article, comprising an unfoamed member of the thermoplastic polymer composition of claim 5 and a member of another material, to heating to effect foaming of the unfoamed member.

13. A method for producing a composite article, comprising the step of subjecting the thermoplastic polymer composition of claim 5 and another material to co-extrusion and foaming.

14. A laminate structure, comprising:
   a fibrous substrate;
   a foam of the thermoplastic polymer composition according claim 1, arranged on the fibrous substrate; and
   a nonporous layer of a thermoplastic elastomer arranged on the foam.

15. The laminate structure according to claim 14, wherein the nonporous layer has an uneven pattern and/or a mirror pattern on its surface.

16. A method for producing the laminate structure of claim 14, comprising the steps of:
   subjecting a thermoplastic polymer composition to melt-extrusion and foaming to give a first film;
   subjecting said first film to press bonding onto a surface of a fibrous substrate, while said first film keeps flowability, to give a first laminate structure having a foam on the surface of said fibrous substrate;
   subjecting a thermoplastic elastomer to melt-extrusion to give a second film; and
   subjecting the second film to press bonding onto the surface of the foam of the first laminate structure, while said second film keeps flowability, to form a nonporous layer on the surface of the foam of the first laminate structure, and
   wherein the thermoplastic polymer composition comprises:
   (i) an alkyl ester of (meth) acrylic acid copolymer (I), having a number average molecular weight of not less than 100,000; and
   (ii) a block copolymer (II) having a polymer block (1) of a block copolymer, which may be hydrogenated, of an aromatic vinyl compound polymer block (a-1) and a conjugated diene polymer block (b-1), and a polymer block (2) of a polyurethane,
   (iii) a thermal decomposition type foaming agent (VI), and
   wherein the weight ratio of the alkyl ester of (meth) acrylic acid copolymer (I) based on the block copolymer (II), falls between 60/40 and 0.1/99.9.

17. A method for producing the laminate structure of claim 15, comprising the steps of:
   subjecting a thermoplastic polymer composition to melt-extrusion and foaming to give a first film;
   subjecting said first film to press bonding onto a surface of a fibrous substrate, while said first film keeps flowability, to give a first laminate structure having a foam on the surface of said fibrous substrate;
   subjecting a thermoplastic elastomer to melt-extrusion to give a second film; and
   subjecting the second film to press bonding onto the surface of the foam of the first laminate structure, while said second film keeps flowability, to form a nonporous layer on the surface of the foam of the first laminate structure,
   wherein an uneven pattern and/or a mirror pattern is formed on the surface of said nonporous layer by embossing the surface of said nonporous layer, while said nonporous layer keeps flowability, and
   wherein the thermoplastic polymer composition comprises:
   (i) an alkyl ester of (meth) acrylic acid copolymer (I), having a number average molecular weight of not less than 100,000; and
   (ii) a block copolvmer (II) having a polymer block (1) of a block copolymer, which may be hydrogenated, of an aromatic vinyl compound polymer block (a-1) and a conjugated diene polymer block (b-1). and a polymer block (2) of a polyurethane,
   (iii) a thermal decomposition type foaming agent (VI), and
   wherein the weight ratio of the alkyl ester of (meth) acrylic acid copolymer (I) based on the block copolymer (II), falls between 60/40 and 0.1/99.9.

18. The thermoplastic polymer composition according to claim 2, further comprising a block copolymer (IV), which may be hydrogenated, having an aromatic vinyl compound polymer block (a-2) and a conjugated diene compound polymer block (b-2).

19. The thermoplastic polymer composition according to claim 2, further comprising a paraffin oil (V).

20. The thermoplastic polymer composition according to claim 2, further comprising a thermal decomposition type foaming agent (VI).

* * * * *